US008312235B2

(12) United States Patent
Shibayama et al.

(10) Patent No.: US 8,312,235 B2
(45) Date of Patent: *Nov. 13, 2012

(54) DATA MIGRATION IN A STORAGE SYSTEM WITH DYNAMICALLY EXPANSIBLE VOLUMES

(75) Inventors: Tsukasa Shibayama, Kawasaki (JP); Wataru Okada, Odawara (JP); Yukinori Sakashita, Sagamihara (JP); Yuri Hiraiwa, Sagamihara (JP); Masahide Sato, Noda (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/359,231

(22) Filed: Jan. 26, 2012

(65) Prior Publication Data

US 2012/0124287 A1   May 17, 2012

Related U.S. Application Data

(63) Continuation of application No. 13/096,786, filed on Apr. 28, 2011, now Pat. No. 8,127,094, which is a continuation of application No. 12/289,893, filed on Nov. 6, 2008, now Pat. No. 7,945,748, which is a continuation of application No. 11/281,581, filed on Nov. 18, 2005, now Pat. No. 7,464,232.

(30) Foreign Application Priority Data

Sep. 27, 2005  (JP) .................................. 2005-279741

(51) Int. Cl.
*G06F 12/16*  (2006.01)

(52) U.S. Cl. ................................ 711/161; 711/E12.002
(58) Field of Classification Search .................. 711/161, 711/162, 165, 112, E12.002
See application file for complete search history.

(56) References Cited

U.S. PATENT DOCUMENTS

| 5,193,171 | A  | 3/1993  | Shinmura et al. |
| 6,108,748 | A  | 8/2000  | Ofek et al. |
| 6,708,252 | B2 | 3/2004  | Yamamoto et al. |
| 7,945,748 | B2 | 5/2011  | Shibayama et al. |
| 2002/0002638 | A1 | 1/2002 | Obara |
| 2002/0133539 | A1 | 9/2002 | Monday |
| 2003/0009619 | A1 | 1/2003 | Kano et al. |
| 2003/0074523 | A1 | 4/2003 | Johnson |
| 2003/0191909 | A1 | 10/2003 | Asano et al. |
| 2003/0221063 | A1 | 11/2003 | Eguchi et al. |
| 2004/0260861 | A1 | 12/2004 | Serizawa et al. |
| 2005/0091455 | A1 | 4/2005 | Kano et al. |

(Continued)

FOREIGN PATENT DOCUMENTS

JP             04-195765          7/1992

(Continued)

OTHER PUBLICATIONS

Extended European Search Report on application No. 06254998.5 dated May 8, 2009.

*Primary Examiner* — Hal Schnee
(74) *Attorney, Agent, or Firm* — Foley & Lardner LLP

(57) ABSTRACT

A data processing system includes a first storage system configured with a virtual logical volume that includes a dynamically expandable volume, a second storage system coupled to the first storage system through a data copy network, a host computer configured to input data to the virtual logical volume, and a management server coupled to the host computer, configured to manage the virtual logical volume.

20 Claims, 26 Drawing Sheets

U.S. PATENT DOCUMENTS

| | | |
|---|---|---|
| 2005/0108485 A1 | 5/2005 | Perego |
| 2005/0138315 A1 | 6/2005 | Eguchi et al. |
| 2005/0154852 A1 | 7/2005 | Nakagawa et al. |
| 2005/0193181 A1 | 9/2005 | Kaneda et al. |
| 2005/0243611 A1 | 11/2005 | Lubbers et al. |
| 2005/0278484 A1 | 12/2005 | Mukker et al. |
| 2006/0095656 A1 | 5/2006 | Ueoka et al. |
| 2006/0106808 A1 | 5/2006 | Kalos et al. |

FOREIGN PATENT DOCUMENTS

| | | |
|---|---|---|
| JP | 2000-293317 | 4/1996 |
| JP | 09-325894 | 12/1997 |
| JP | 2003-015915 | 7/2001 |
| JP | 2001-318833 | 11/2001 |
| JP | 2001-344188 | 12/2001 |
| JP | 2003-345522 | 5/2002 |
| JP | 2005-011316 A | 1/2005 |

FIG.3

| HOST WWN | DEVICE ID | LUN | HOST REQUEST MAXIMUM SIZE | ASSIGNED SEGMENT SIZE |
|---|---|---|---|---|
| 10:00:34.... | A.149 | 0 | 50000 | 3000 |
| 10:00:34.... | A.149 | 1 | 10000 | 1000 |
| 10:00:4E.... | A.433 | 0 | 15000 | 1000 |

| POOL ID 3210 | DISK ID 3211 | SEGMENT NUMBER 3212 | LBA START ADDRESS 3213 | LBA END ADDRESS 3214 | USAGE STATUS 3215 | RESERVATION STATUS 3216 | RESERVATION DEVICE VOLUME 3217 |
|---|---|---|---|---|---|---|---|
| 0 | 0 | 0 | 0 | 499 | 0 | 0 | - |
| 0 | 0 | 1 | 500 | 1800 | 1 | 0 | - |
| 0 | 0 | 2 | 1801 | 3000 | 1 | 0 | - |
| 0 | 1 | 3 | 0 | 700 | 1 | 0 | - |
| 0 | 1 | 4 | 701 | 3000 | 0 | 0 | - |
| 0 | 2 | 5 | 0 | 1000 | 0 | 0 | - |
| 0 | 2 | 6 | 1001 | 1300 | 1 | 0 | - |
| 0 | 2 | 7 | 1301 | 1700 | 0 | 0 | - |
| 1 | 3 | 8 | 0 | 300 | 0 | 1 | A.149.0 |
| 1 | 3 | 9 | 301 | 1000 | 0 | 1 | A.149.0 |
| 1 | 3 | 10 | 1001 | 1200 | 0 | 0 | - |

FIG.5

| LUN (3220) | SEGMENT NUMBER (3221) | LBA START ADDRESS OF LUN (3222) | LBA END ADDRESS OF LUN (3223) |
|---|---|---|---|
| 0 | 1 | 0 | 1299 |
| 0 | 3 | 1300 | 2000 |
| 1 | 2 | 0 | 1200 |
| 2 | 6 | 0 | 300 |

FIG.13

| DISK ID OF STORAGE SYSTEM | WWN OF EXTERNAL PORT | DEVICE ID OF EXTERNAL STORAGE SYSTEM | LUN OF EXTERNAL VOLUME |
|---|---|---|---|
| 1 | 10:00:34:5E:··· | A.199 | 1 |
| 4 | 10:00:34:8D:··· | B.633 | 3 |

3250, 3251, 3252, 3253

DATA MIGRATION IN A STORAGE SYSTEM WITH DYNAMICALLY EXPANSIBLE VOLUMES

CROSS-REFERENCES TO RELATED APPLICATIONS

This application is a Continuation of U.S. patent application Ser. No. 13/096,786 filed on Apr. 28, 2011, which is a Continuation of U.S. patent application Ser. No. 12/289,893 filed on Nov. 6, 2008 (now U.S. Pat. No. 7,945,748), which is a Continuation of U.S. patent application Ser. No. 11/281,581 filed on Nov. 18, 2005 (now U.S. Pat. No. 7,464,232), which claims priority to Japanese Patent Application No. 2005-279741 filed on Sep. 27, 2005. The disclosures of the aforementioned applications are incorporated herein by reference in their entirety.

BACKGROUND OF THE INVENTION

The present invention relates a data processing system, data management method and storage system for providing a dynamically capacity-expansible storage region to a host computer.

In recent years, a storage system for providing a storage region of data to a host computer is able to have a multitude of large capacity physical disks, and massive enlargement of the storage capacity is making progress. With this kind of storage system, foremost, a disk array configured in RAID (Redundant Array of Independent Disks) is created from physical disks, and a plurality of such physical storage resources are gathered to create a pool area, and a storage region of the capacity requested by the host computer from the pool area is created as a logical volume and provided to the host computer.

Here, pursuant to the massive enlargement of the storage system, the size of the storage region requested by the host computer is also becoming enlarged, and a large quantity of physical disks to cover the entire capacity must be prepared at one time upon introducing the storage system. Nevertheless, as a result of technological changes, a more reliable storage system can be created by adding physical disks that are newly introduced. Further, certain clients are not able to determine the capacity to be prepared, and there are cases where it is not possible to decide the quantity of physical disks to be prepared.

Thus, technology has been invented for adding physical disks as necessary when the disk capacity utilization nears maximum capacity without preparing physical disks from the initial stages of introduction for the entire capacity to be provided to the host computer, and dynamically changing the storage capacity to be provided to the host computer (e.g., refer to gazette of Japanese Patent Laid-Open Publication No. 2003-015915, hereinafter "Patent Document 1").

With this technology, in the foregoing storage system, a logical volume of a fixed capacity is not created from the pool area, and a virtual logical volume is foremost provided to the host computer. And, the dynamic capacity expansion is realized by dynamically assigning a storage region, which is a certain unit (the unit of this storage region is hereinafter referred to as a "segment"), to the virtual logical volume according to the I/O (Input/Output) from the host computer.

Further, when the operation employing the storage system is continued, data of low frequency of use will remain stored in an expensive disk that is highly reliable, responsive and endurable. Here, there is a problem in that an overly expensive disk capacity will be used, and an expensive disk cannot be efficiently used.

Nevertheless, under US laws and regulations, email data and medical data must be stored for a fixed period of time even if the frequency of use thereof is low. Thus, technology has been invented for migrating data from an expensive disk to an inexpensive disk which is inferior in terms of reliability, responsiveness and endurance in comparison to such expensive disk (e.g., refer to gazette of Japanese Patent Laid-Open Publication No. 2000-293317, hereinafter "Patent Document 2"; specification of U.S. Pat. No. 6,108,748, hereinafter "Patent Document 3"; and gazette of Japanese Patent Laid-Open Publication No. 2003-345522, hereinafter "Patent Document 4").

As the data destination, there are a storage region in the same storage system (refer to Patent Document 2), a storage region of different storage systems (refer to Patent Document 3), and a storage region of different storage systems being managed virtually as a single storage system (refer to Patent Document 4). Further, this technology is also used for dividing data into a plurality of disk arrays to perform load balancing when I/O from the host computer is concentrated on a single disk array configuring RAID.

SUMMARY OF THE INVENTION

According to Patent Document 1, the dynamic capacity expansion of the virtual logical volume assigned to the host computer will be conducted without any particular limitation when an I/O request is made from the host computer to the logical volume so as long as the remaining capacity of the pool area, which is a physical resource, exists. Thus, when dynamically assigning a segment from a single pool area to a plurality of logical volumes used by a plurality of host computers, regardless of which host computer gives the I/O request, the segment will be assigned from the pool area in order from the earliest request that is made.

Thus, in a case where data migration is to be executed to a dynamically capacity-expansible logical volume, and a dynamically capacity-expansible logical volume of another host computer is using the pool area of the data migration destination, even though the pool capacity of the destination is sufficient for the completion data migration at the time data migration is started, the segment will be assigned to a separate logical volume during the data migration. As a result, there is a problem in that the capacity of the pool area in the destination will fall short, and data migration will end in a failure.

In order to overcome the foregoing problems, in one aspect of the present invention, provided is a data processing system having a storage system for providing a dynamically expansible volume, a host computer for inputting and outputting data to and from the volume, and a management server for managing the volume; wherein the management server includes: a confirmation unit for confirming the connection status of the host computer and the volume upon migrating data stored in a storage region assigned to the volume to another storage region; and a transmission unit for transmitting to the storage system the maximum capacity of the volume requested by the host computer when the host computer and the volume are connected and transmitting to the storage system the current capacity of the volume when the host computer and the volume are not connected based on the confirmatory result of the confirmation unit; wherein the storage system comprises a reservation unit for reserving the capacity transmitted from the management server so that it is exclusively secured in another storage region to which the data is to be migrated.

Further, in another aspect of the present invention, provided is a data management method of a data processing system having a storage system for providing a dynamically expansible volume, a host computer for inputting and outputting data to and from the volume, and a management server for managing the volume, including: a first step of confirming the connection status of the host computer and the volume upon migrating data stored in a storage region assigned to the volume to another storage region; a second step of transmitting to the storage system the maximum capacity of the volume requested by the host computer when the host computer and the volume are connected and transmitting to the storage system the current capacity of the volume when the host computer and the volume are not connected based on the confirmatory result of the confirmation unit; and a third step of reserving the capacity transmitted from the management server so that it is exclusively secured in another storage region to which the data is to be migrated.

Moreover, in another aspect of the present invention, provided is a storage system connected to a host computer for inputting and outputting data to and from a dynamically expansible volume, and which is for providing the volume to the host computer, including: a confirmation unit for confirming the connection status of the host computer and the volume upon migrating data stored in a storage region assigned to the volume to another storage region; and a reservation unit for reserving the maximum capacity of the volume requested by the host computer so that it is exclusively secured in another storage region to which the data is to be migrated when the host computer and the volume are not connected, and reserving the current capacity of the volume so that it is exclusively secured in another storage region when the host computer and the volume are not connected based on the confirmatory result of the confirmation unit.

Accordingly, even when a dynamically capacity-expansible volume of a separate host computer is using another storage region, it is possible to prevent a segment from being assigned to a separate logical volume during the data migration.

According to the present invention, a highly reliable data processing system, data management method and storage system capable of effectively preventing any failure of data migration from happening are realized.

BRIEF DESCRIPTION OF THE DRAWINGS

FIG. 3 is a diagram showing an example of a volume mapping table in the first embodiment;

FIG. 4 is a diagram showing an example of a segment management table in the first embodiment;

FIG. 5 is a diagram showing an example of a volume address list in the first embodiment;

FIG. 13 is a diagram showing an example of an external volume mapping table in the second embodiment;

DETAILED DESCRIPTION OF THE INVENTION

Next, embodiments of the present invention are explained in order. Incidentally, this invention shall not be limited by these embodiments.

(1) First Embodiment
(1-1) System Configuration

Figure 1:
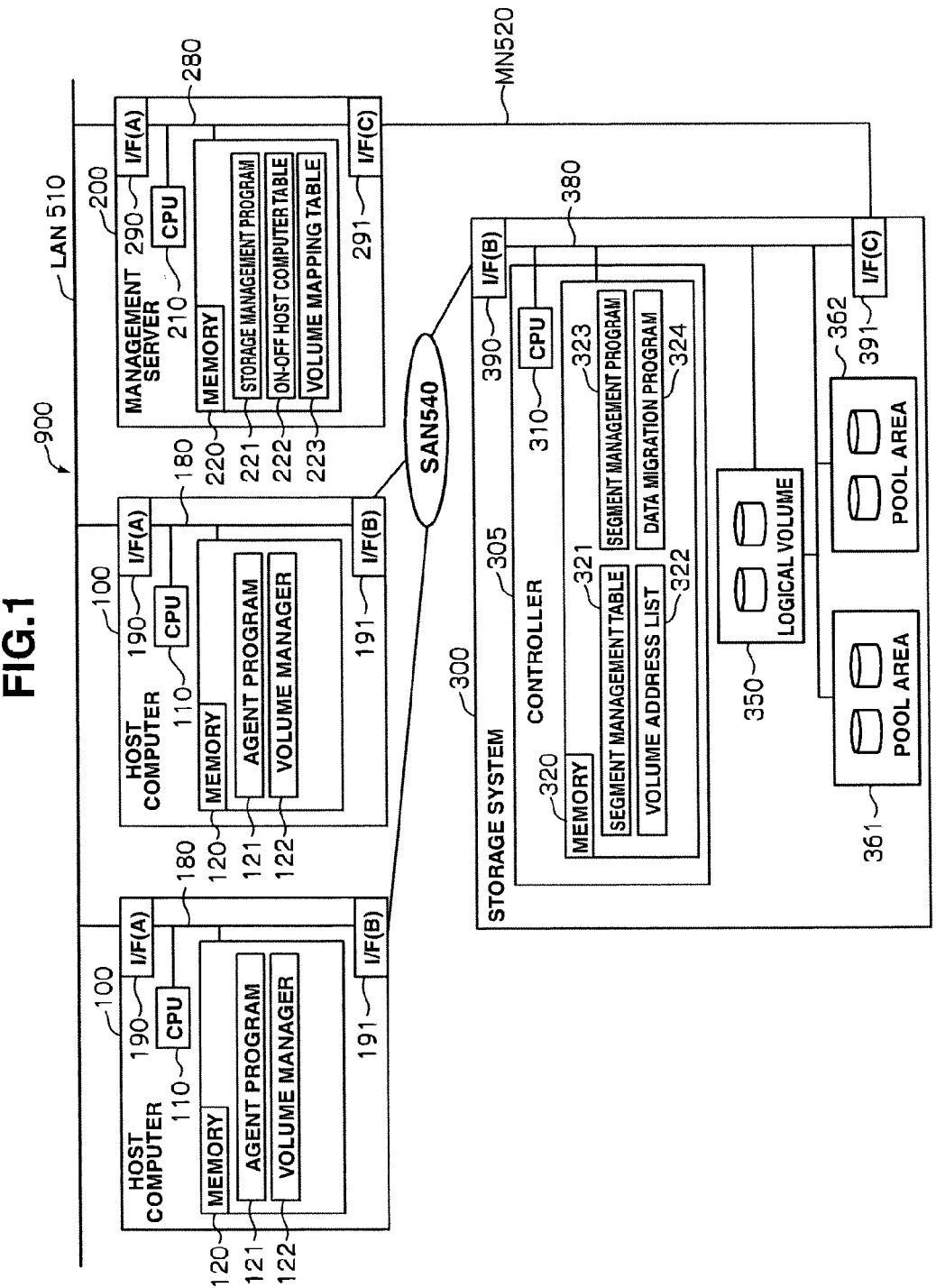
FIG. 1 is a diagram showing the system configuration in the first embodiment.

FIG. 1 is an explanatory diagram showing the configuration of a data processing system as an embodiment of the present invention. This data processing system 900 has a plurality of host computers 100, a management server 200, and a storage system 300. The host computers 100 and storage system 300 are respectively connected to a storage area network SAN 540. The management server 200 is connected to the storage system 300 via a management network MN 520. Further, the host computers 100 and management server 200 are respectively connected to a local area network LAN 510. Incidentally, although there are two host computers 100 in the present embodiment, this may be one host computer or two or more host computers. Moreover, the LAN 510, management network MN 520 and SAN 540 may be of the same network in the present embodiment. In addition, a storage system configured by integrating the management server 200 and storage system 300 may also be used in the present embodiment.

The host computer 100 has a CPU (Central Processing Unit) 110, a memory 120, an interface 190 for connection with the local area network LAN 510, and an interface 191 for connection with the storage area network SAN 540. These respective constituent elements are mutually connected via a bus 180. Functions of the host computer 100 are realized by the CPU 110 executing programs. This host computer 100, for instance, is configured so as to input and output data to and from the storage system 300 via the storage area network SAN 540.

The memory 120 stores data and programs to be used by the CPU 110. In particular, the memory 120 has an agent program 121 and a volume manager 122. The agent program 121 is a program to be executed by the CPU 110, and is a program for transmitting information of the host computer 100 to the management server 200. The volume manager 122 is a program to be executed by the CPU 110, and executes the mount/unmount processing of the volume to be provided from the storage system 300.

The host computer 100 also has a data input device for a user of the host computer to input data and a display device for a user of the host computer to present information, but these are not illustrated since they do not relate directly to the present invention.

The management server 200 has a CPU 210, a memory 220, an interface 290 for connection with the local area network LAN 510, and an interface 291 for connection with the management network MN 520. These respective constituent elements are mutually connected via a bus 280. Functions of the management server 200 are realized by the CPU 210 executing programs.

The memory 220 stores data and programs to be used by the CPU 210. In particular, the memory 220 has a storage management program 221, an on-off host computer table 222 and a volume mapping table 223. The storage management program 221 is a program to be executed by the CPU 210.

Figure 2:
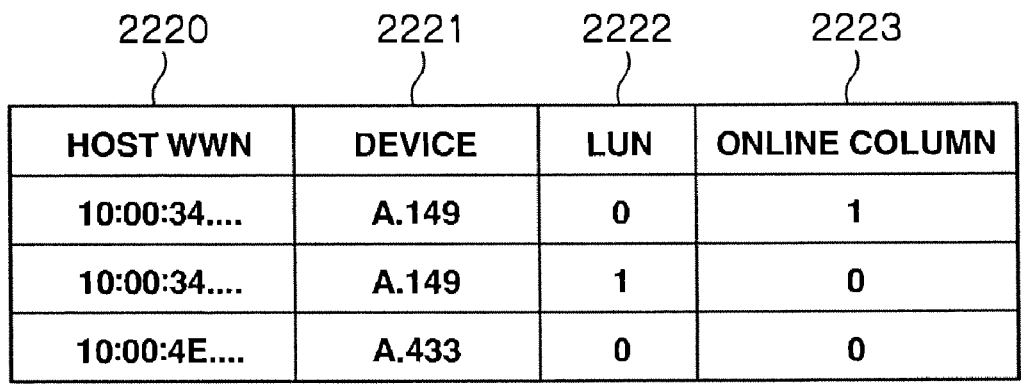
FIG. 2 is a diagram showing an example of an on-off host computer table the first embodiment.

The on-off host computer table 222, as shown in FIG. 2, is a table for showing whether the connection status of the host computer 100 and the volume to be provided from the storage system 300 is online or offline, and is configured from four columns; namely, a host WWN (World Wide Name) 2220 for identifying the computer, a device ID 2221 for identifying the storage system, a LUN (Logical Unit Number) 2222 as the identifying number of the logical volume, and an online column 2223 for showing whether the host computer 100 is connected to the logical volume; that is, the connection status of the logical volume. Here, when it is online, this shows that the host computer 100 is connected to the logical volume, and when it is offline, this shows that the host computer 100 is not connected to the logical volume. Incidentally, in the illustrated example, although "0" represents offline and "1" represents online in the online column 2223, it is not necessarily the case that this method must be used for such representation.

The volume mapping table 223, as shown in FIG. 3, is a table for showing information of the size assigned to the logical volume, and is configured from a host WWN 2230, a device ID 2231, a LUN 2232, a host request maximum size 2233 for storing the maximum segment size to be assigned to the logical volume preset by the host computer, and an assigned segment size 2234 for storing the segment size assigned to the logical volume.

The management server 200 also has a data input device for a user of the management server to input data and a display device for a user of the management server to present information, but these are not illustrated since they do not relate directly to the present invention.

The storage system 300 provides a data storage region to the host computer 100. The storage system 300 has a controller 305, a virtual logical volume 350 to be provided to the host computer, pool areas 361 and 362 as physical resources for assigning a segment to the virtual logical volume, an interface 390 for connection with the storage area network SAN 540, and an interface 391 for connection with the management network MN 520. These respective constituent elements are mutually connected via a bus 380.

Here, the logical device on RAID configured from a plurality of hard disks is defined as a physical resource. Further, a logical volume represents a volume configured from one or more physical resources and provided as a logical storage region for storing data in the host computer. The pool area is configured from a plurality of physical disks. Data input to the host computer is stored in the physical disk of the pool area. Although two pool areas 361, 362 are illustrated in the example, this is not limited thereto, and it will suffice so as long as there are one or more pool areas.

The controller 305 has a CPU 310 and a memory 320. Further, the memory 320 stores data and programs to be used by the CPU 310 upon executing various types of processing. The memory 320 has a segment management table 321, a volume address list 322, a segment management program 323, and a data migration program 324. Each module is a program to be executed by the CPU 310.

The segment management table 321, as shown in FIG. 4, is a table for showing information of the segment assigned to the volume, and is configured from eight columns; namely, a pool ID 3210 for identifying the pool area, a disk ID 3211 for identifying the physical disk in the pool area, a segment number 3212 of the segment assigned to the logical volume, an LBA (Logical Block Address) start address 3213 of the segment, an LBA end address 3214 of the segment, a column 3215 representing whether the segment is assigned to the logical volume or not, a column 3216 representing the reservation status for data migration, and a column 3217 representing the reserved logical volume. Here, "reservation" means to exclusively secure the capacity of the pool area so that it will not be used by other logical volumes. The segment size represented with the LBA start address 3213 of the segment and the LBA end address 3214 of the segment may or may not be a fixed value.

In the illustrated example, although "0" represents the segment is not assigned to the logical volume and "1" represents the segment is assigned to the logical volume in the column 3215 representing that the volume is assigned, it is not necessarily the case that this method must be used for such representation. The column 3216 representing the reservation status for data migration is a column representing the reservation status when the data migration program 324 is to reserve a segment, prior to executing data migration, in order to reliably execute data migration. In the illustrated example, although "0" represents unreserved and "1" represents reserved in the column 3216 representing the reservation status, it is not necessarily the case that this method must be used for such representation. The column 3217 representing the reserved logical volume sets information showing the device and logical volume of the data migration source reserved with the column 3216 representing the reservation status. The value to be actually set may adopt any form so as long as it is information capable of uniquely identifying the device and logical volume of the data migration source.

The volume address list 322, as shown in FIG. 5, is configured from four columns; namely, a LUN 3220, a segment number 3221, an LBA start address 3222 of the LUN, and an LBA end address 3223 of the LUN. The volume address list 322 is a table associating the segment assigned to the host computer 100 and the LBA of the logical volume being used by the host computer 100.

The segment management program 323 is a program to be executed by the CPU 310, and is a program for managing the segment to be assigned to the volume to be provided to the host computer 100. The data migration program 324 is a program to be executed by the CPU 310, and is a program for executing data migration between storage regions.

Figure 6:
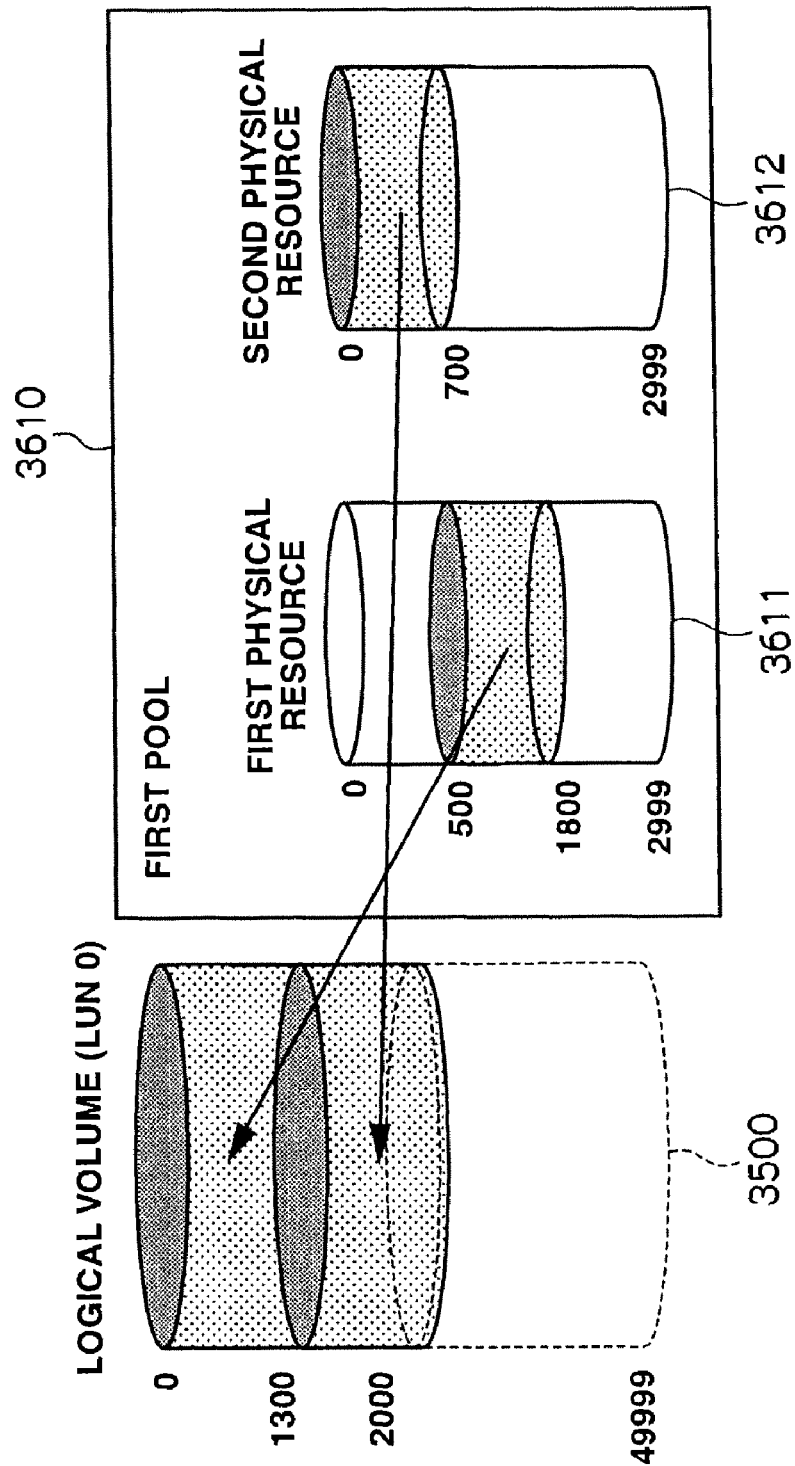
FIG. 6 is a diagram showing the relationship between the logical volume and the segment management table and volume address list in the first embodiment.

Here, an example of the logical volume according to the present embodiment is illustrated in FIG. 6. In this example, segments of a first physical resource 3611 and a second physical resource 3612 of a first pool 3610 are assigned to a logical volume 3500.

Configuration information of this logical volume 3500 is managed by the volume address list 320 depicted in FIG. 5. The LUN 3220 stores "0" as the number for identifying the logical volume 3500 from the host computer 100. The segment number 3221 stores identifying numbers "1" and "3" of the segments assigned to the logical volume. The LUN start address 3222 and LUN end address 3223 store the address of the respective areas used by the host computer 100.

Further, information regarding the segments of the first physical resource 3611 and second physical resource 3612 of the first pool 3610 assigned to this logical volume 3500 is managed by the segment management table 321 depicted in FIG. 4. The pool number 3210 stores "0" as the identifying number of the pool. The disk ID 3211 stores "0" and "1" as the identifying numbers of the first physical resource 3611 and second physical resource 3612. The segment number 3212 stores values from "0" to "10" as identifying numbers of segments. The LBA start address 3213 and LBA end address 3214 store the address of the respective segments. The usage status 3215 stores information regarding whether or not a segment has been assigned to the logical volume. In this example, "1" which means "assigned" is stored in relation to segment number "1" and segment number "3" which are segments that have been assigned to the logical volume 3500.

As shown in this example, the volume address list 322 and segment management table 321 manage the configuration information of the logical volume.

(1-2) Explanation of Data Processing Procedures

Figure 7:
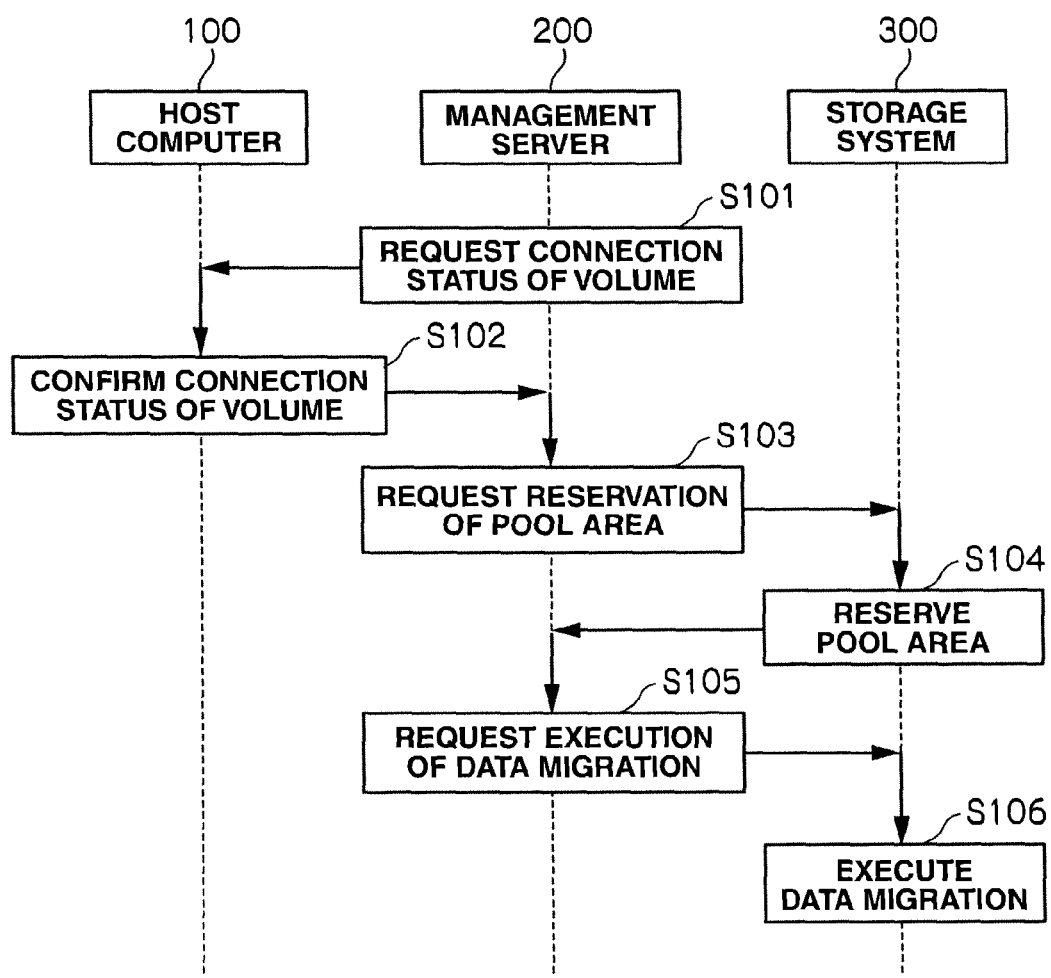
FIG. 7 is a diagram showing the outline of an operational sequence among the respective devices in the first embodiment.

FIG. 7 shows the outline of a sequence among the respective devices. Foremost, in flow S101, the management server 200 makes an inquiry to the host computer 100 regarding the connection status of the volume in order to acquire the connection status between the migration source volume and the host computer 100 for performing data migration. Next, in flow S102, the host computer 100 checks the connection status of the volume and transmits the result thereof to the management server 200.

Next, in flow S103, the management server 200 calculates the area required for data migration based on the result of the connection status of the volume from the host computer 100, and transmits an area reservation request to the storage system 300.

Next, in flow S104, the storage system 300 reserves the pool area in a size requested by the management server 200.

Next, in flow S105, the management server 200 sends a data migration request of the logical volume to the storage system 300. Finally, in flow S106, the storage system executes data migration of the logical volume. After the completion of data migration, if there is an unused reserved area, the reservation is cancelled and the area is released. Each flow is now explained in detail below.

Figure 8:
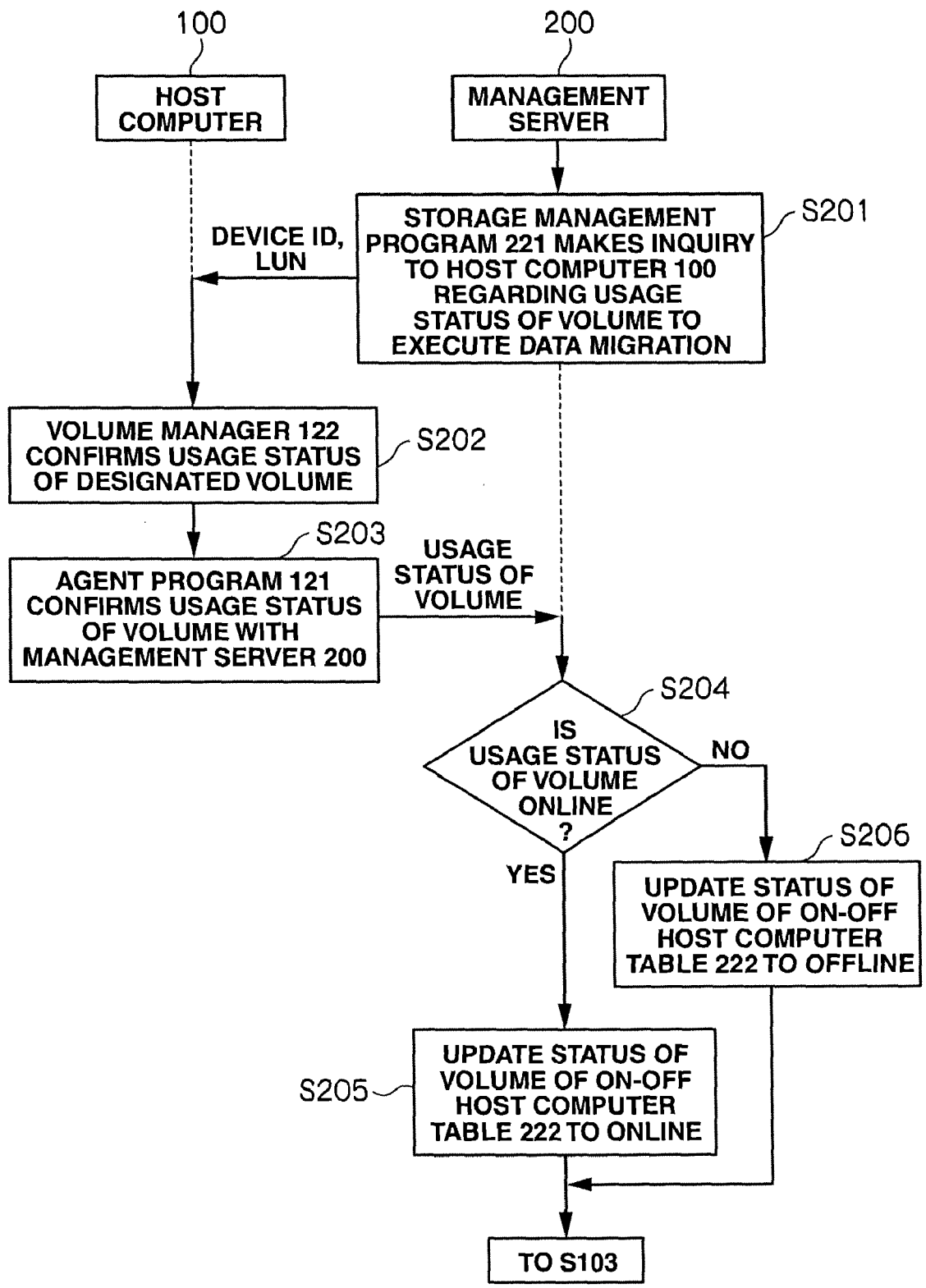
FIG. 8 is a diagram showing the procedures for confirming the connection status of the volume of the host computer in the first embodiment.

FIG. 8 shows the detailed procedures of flow S101 and flow S102. At step S201, the storage management program 221 in the management server 200 makes an inquiry to the host computer 100 regarding the usage status of the volume to execute data migration. Here, the storage management program 221 transmits the device ID and LUN of the relevant volume to the host computer 100.

At step S202, the volume manager 122 in the host computer 100 confirms the usage status of the designated volume. If the host computer 100 has the volume mounted thereon, this is determined as being online, and if not, this is determined as being offline.

At step S203, the agent program in the host computer 100 receives the result of the connection information of the volume manager 122, and transmits the result of whether the usage status of the volume is online or offline to the storage management program 221 of the management server 200.

At step S204, the management server 200 determines whether the result of the connection status of the volume is online or offline. If the connection status of the volume is online, the routine proceeds to step S205. If it is offline, the routine proceeds to step S206.

At step S205, the storage management program 221 in the management server 200 updates the column 2223 of the connection status of the volume of the on-off host computer table 222 to online (="1").

At step S206, the storage management program 221 in the management server 200 updates the column 2223 of the connection status of the volume of the on-off host computer table 222 to offline (="0").

Figure 9:
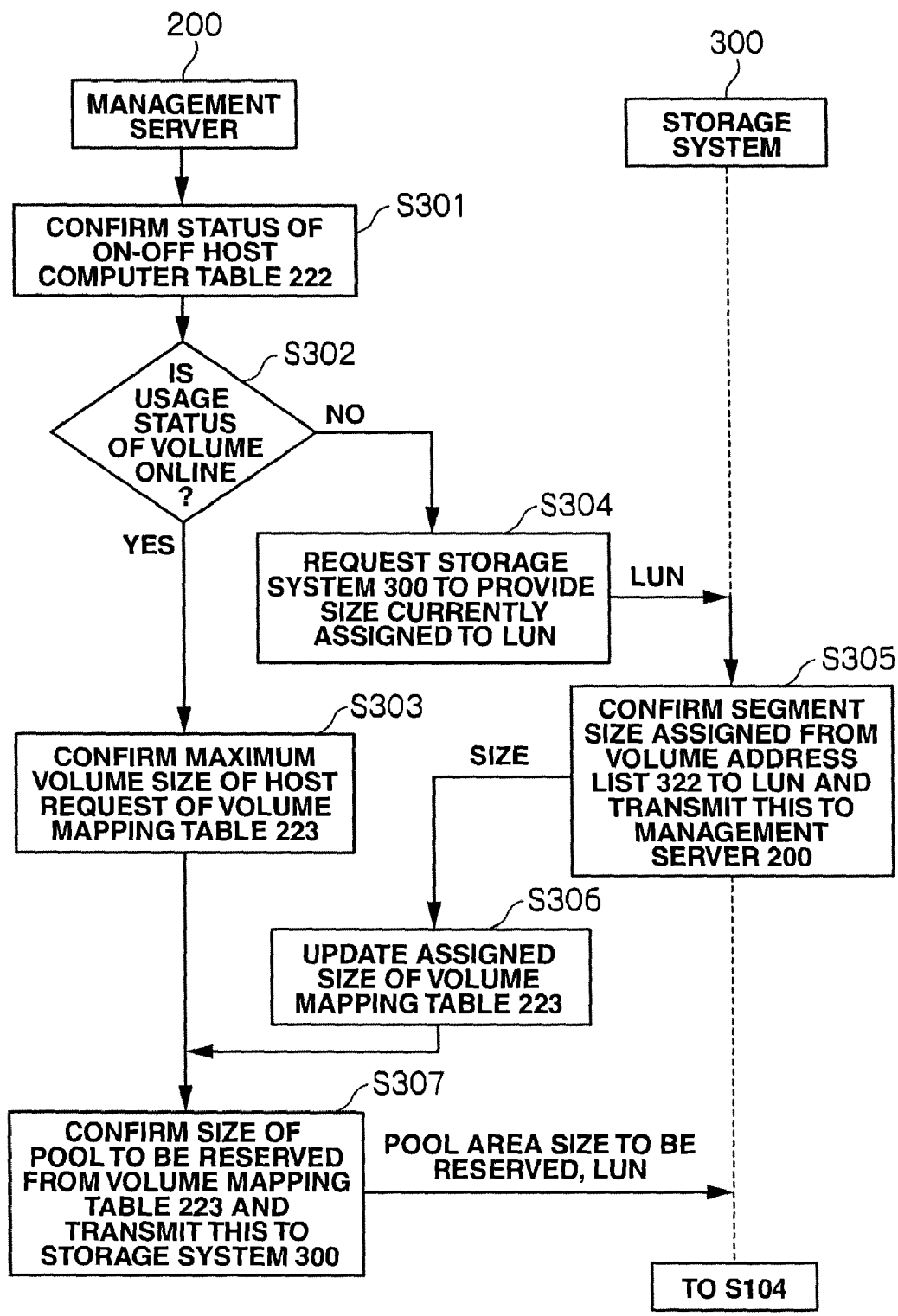
FIG. 9 is a diagram showing the procedures for transmitting a pool area reservation order from the management server to the storage system in the first embodiment.

Next, details of flow S103 for requesting the reservation of the pool area are shown in FIG. 9. Foremost, at step S301, the management server 200 checks the connection status of the volume from the connection status volume 2223 of the volume of the on-off host computer table 222.

At step S302, whether the connection status of the volume is online or offline is determined. If the usage status of the volume is online, the routine proceeds to step S303. If it is offline, the routine proceeds to step S304.

At step S303, the storage management program 221 confirms the area size to be reserved from the column 2233 representing the maximum size of the host request of the volume mapping table 223. Thereafter, the routine proceeds to step S307.

At step S304, the storage management program 221 transmits a request to the storage system 300 for acquiring the size currently assigned to the volume of data migration. Here, the storage management program 221 transmits to the storage system 300 the LUN for identifying the volume.

At step S305, the segment management program 323 confirms the segment size assigned from the LBA end address 3223 of the LUN of the volume address list 322, and transmits the assigned segment size to the management server 200.

At step S306, the storage management program 221 updates the value of the column 2234 of the assigned segment size of the volume mapping table 223 into a value transmitted from the segment management program 323.

At step S307, the storage management program 221 confirms the area of the volume to be reserved, and transmits a pool area reservation request to the storage system 300. Here, the storage management program 221 transmits to the storage system 300 the LUN of the volume to perform data migration and the size of the pool area to be reserved.

Figure 10:
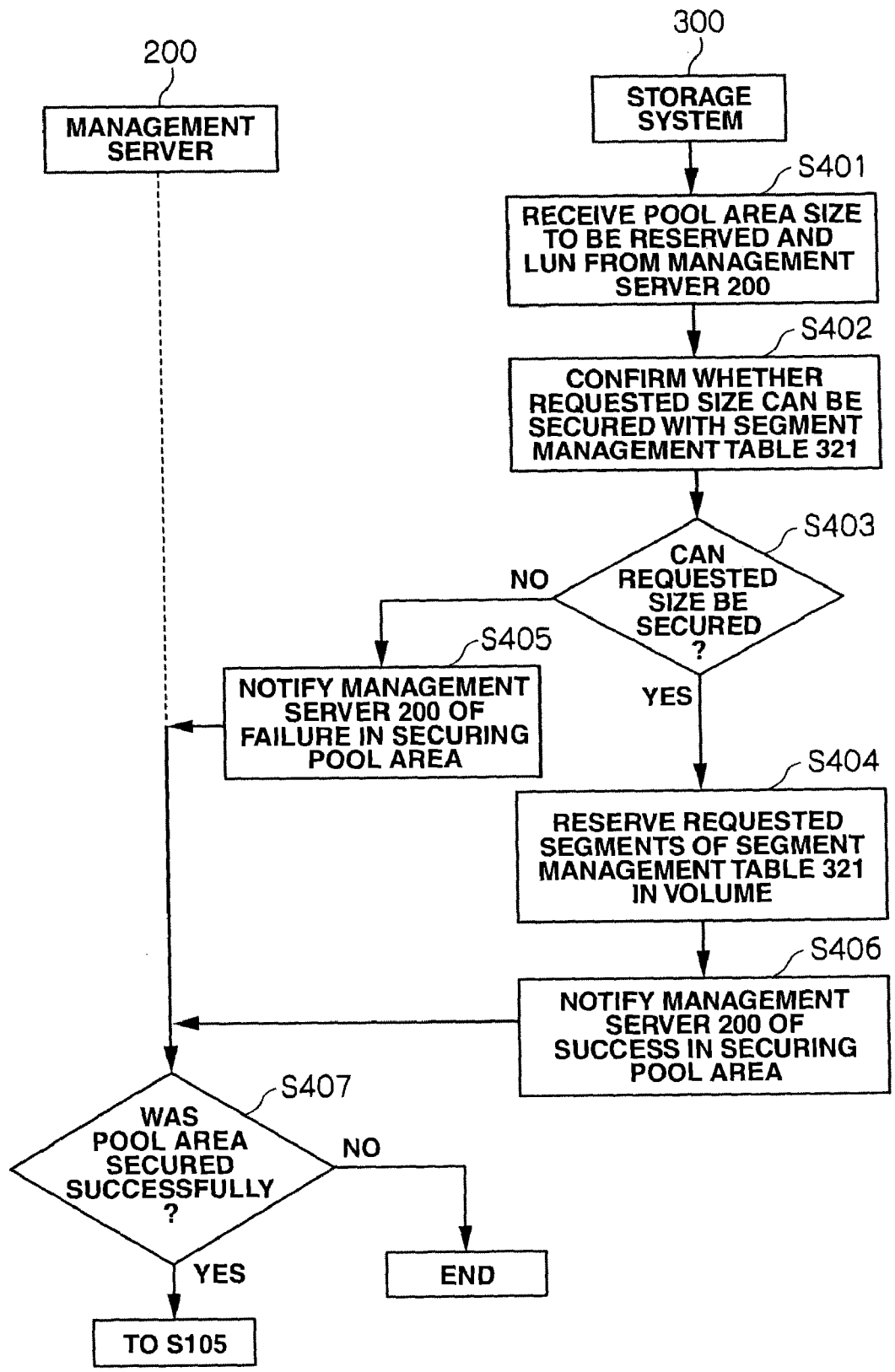
FIG. 10 is a diagram showing the procedures for reserving the pool area with the storage system in the first embodiment.

Next, details of flow S104 for executing the reservation of the pool area are shown in FIG. 10. Foremost, at step S401, the storage system 300 receives from the storage management program 221 the pool size to be reserved and the LUN to perform data migration.

At step S402, the segment management program 323 calculates the sum of the segment sizes of an unused state in the pool area having a pool ID separate from the pool area that is currently being used from two pieces of information; namely, the size requested by the management server 200 and the LUN from the segment management table 321, and checks whether the size requested from the storage management program 221 can be secured.

At step S403, if the sum of the segment sizes of an unused status is greater than the size requested from the storage management program 221, the requested size is determined to be securable, and the routine proceeds to step S404. If not, the requested size is determined to be not securable, and the routine proceeds to step S405.

At step S404, in order to reserve segments worth the area capable of satisfying the requested size, the segment management program 323 updates the status to in-reservation (="1") in an amount of the requested size of the column 3216 representing the reservation status for data migration of the segment management table 321, and further inputs the device ID and LUN representing the volume of data migration in the column 3217 representing the reserved logical volume. Thereafter, at step S406, the segment management program 323 transmits a notice to the management server 200 indicating the successful reservation of the pool area.

At step S405, the segment management program 323 transmits a notice to the management server 200 indicating the failure in securing the pool area.

At step S407, the storage management program 221 receives the notice indicating whether the pool area could be secured, and determines whether the reservation is complete. If the reservation is complete, the routine proceeds to step S105. If not, the routine ends the data migration processing, and issues a warning to the user using the management server 200. The method of issuing the warning, for instance, may be conducted by displaying an error message on a display device (not shown) of the management server 200, or raising an alarm with a speaker (not shown) of the management server 200. As a result, the user will be able to handle the situation adequately.

Figure 11:
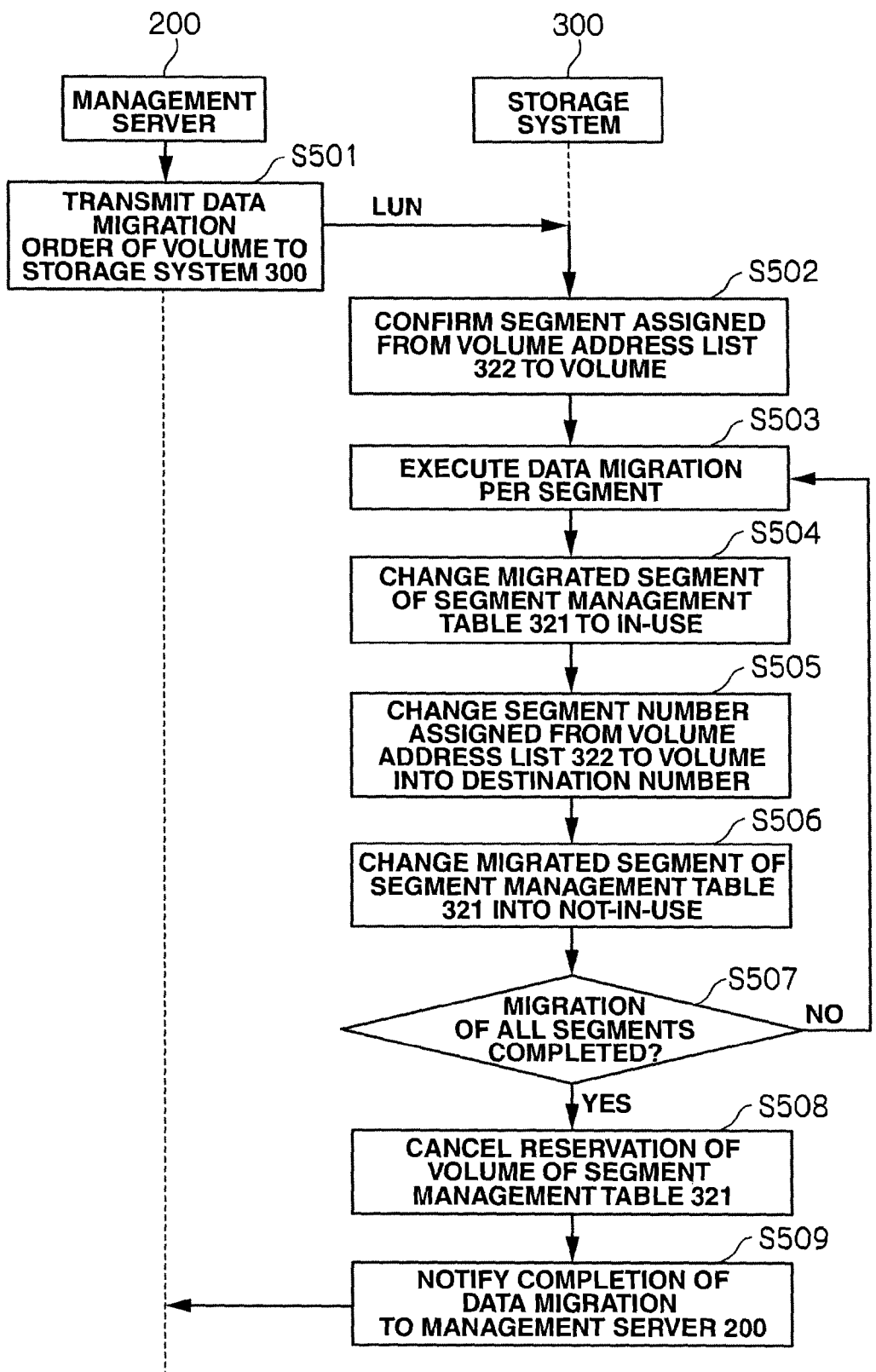
FIG. 11 is a diagram showing the procedures of data migration in the first embodiment.

Next, details of flows S105 and S106 for requesting and executing data migration are shown in FIG. 11. At step S501, the storage management program 221 transmits a data migration request of the volume to the storage system 300. Here, the storage management program 221 transmits the LUN to the storage system 300.

At step S502, the data migration program 324 confirms the segment assigned to the volume from the volume address list 322. The data to be actually migrated is only the data of this segment.

At step S503, the data migration program 324 executes data migration to the respective segments while referring to the volume address list 322.

At step S504, the segment management program 323 changes the usage status column 3215 of the migrated segment number of the segment management table 321 to in-use (="1").

At step S505, the data migration program 324 changes the value of the segment number column 3221 assigned to the volume of the volume address list 322 from the segment value before migration to the segment value after migration.

At step S506, the segment management program 323 changes the usage status column 3215 of the segment number of the segment in the migration source data of the segment management table 321 to not-in-use (="0"). While proceeding from step S505 to step S506, when the host computer 100 accesses this segment, the CPU 310 provides the segment data after migration to the host computer 100.

At step S507, the data migration program 324 checks whether the migration of all data of the logical volume is complete. If complete, the routine proceeds to step S508. If the migration of all data is not complete, the routine proceeds to S503.

At step S508, the segment management program 323 changes the value of the reservation status column 3216 and the reservation logical volume column 3217 of the volume of the segment management table 321 from "1" to "0". Thereby, reservation for data migration of the volume is cancelled, and the segment will be released.

At step S509, the data migration program 324 transmits a notice to the management server 200 indicating the completion of data migration.

As described above, in the present embodiment, the memory 320 of the storage system 300 has a segment management table 321 for managing the segment dynamically assigned to the logical volume, a volume address list 322 showing the correspondence of the assigned segment and logical volume, a segment management program 323 for managing the segment, and a data migration program 324 for executing data migration.

Further, the memory 220 of the management server 200 has an on-off host computer table 221 showing the connection relationship of the host computer and the volume, a volume mapping table 222 showing the maximum volume capacity requested by the host, and a volume management program 223 for managing the volume of the storage system.

And, by executing flows S101, S102, S103, S104, S105 and S106, the reservation and release of a destination area during data migration of a dynamically capacity-expansible logical volume will be enabled, and the failure during data migration can be prevented thereby.

Specifically, in the present embodiment, by assigning a physical resource to a virtual logical volume provided to a host computer in accordance with the I/O request from the host computer, in a storage system having a function capable of dynamically expanding the area of a volume, a management server checks the connection relationship of the host computer and the volume assigned to the host computer before the execution of data migration. The management server is provided with an on-off host computer table showing the connection relationship of the host computer and the volume, a volume mapping table showing the maximum volume capacity requested by the host, and a volume management program for managing the volume of the storage system. The storage system is provided with a segment management table for managing the segment dynamically assigned to the logical volume, a volume address list showing the correspondence of the assigned segment and the logical volume address, a segment management program for managing the segment, and a data migration program for executing data migration.

When the status of the logical volume to perform data migration in the on-off host computer table is offline, the total capacity of the segment size currently assigned to the logical volume is inquired to the storage system, and the pool area of the destination is reserved for the size thereof. When the status of the logical volume to perform data migration in the on-off host computer table is online, the pool area of the data migration destination is reserved in the size requested by the host based on the maximum size of the host request of the volume mapping table. If the reservation is not completed due to insufficient capacity or other reasons, the storage system issues a warning to the management server.

When the reservation is complete, data migration processing is executed. Data migration is executed for each segment, and only data assigned to the logical volume is migrated. If there is an unused area among the reserved areas after the data migration is executed, the reservation is cancelled and the reserved pool area is released.

(2) Second Embodiment (2-1) System Configuration

Figure 12:
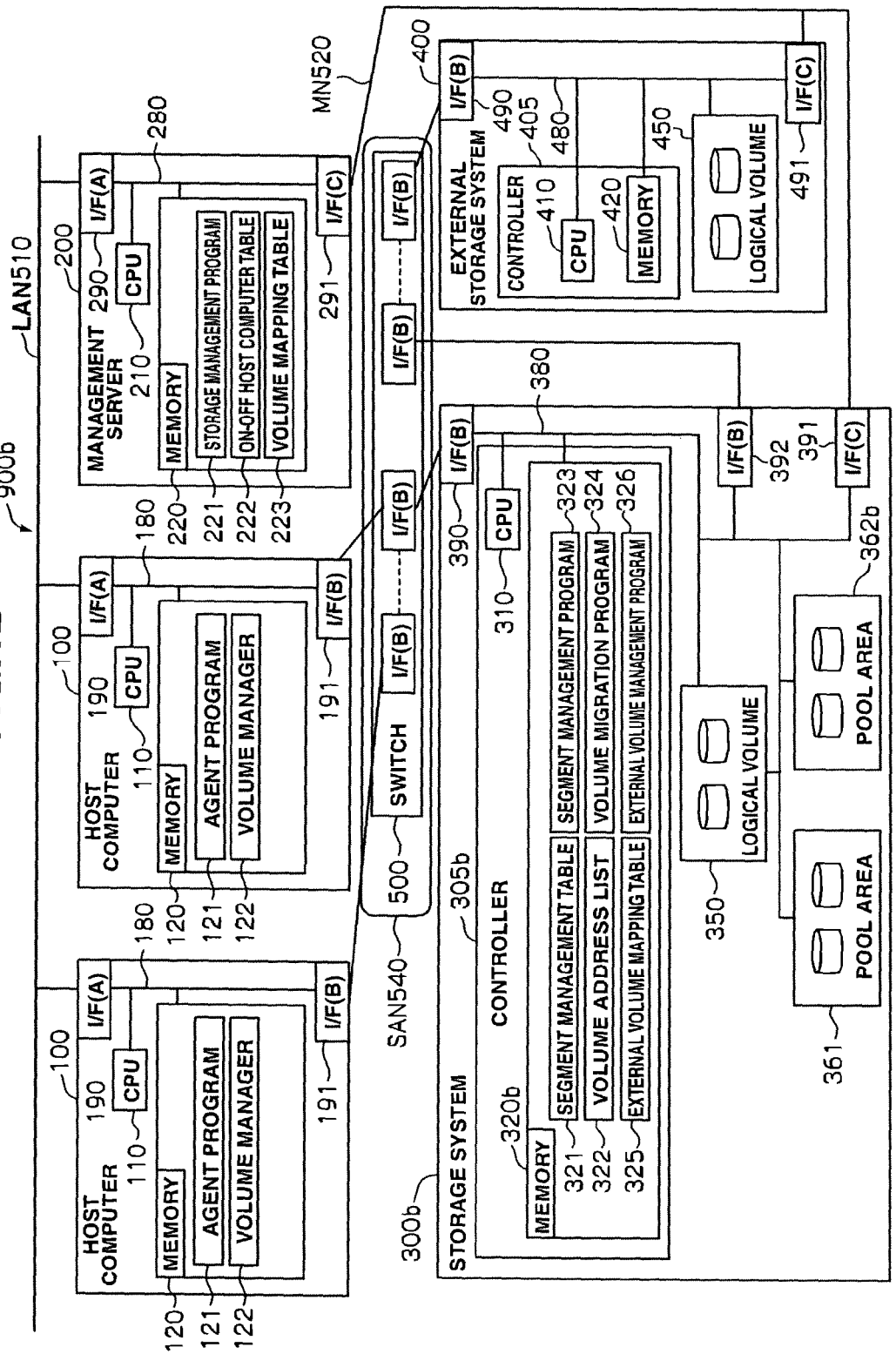
FIG. 12 is a diagram showing the system configuration in the second embodiment.

FIG. 12 is an explanatory diagram showing the configuration of a data processing system 900b in the second embodiment. This data processing system 900b has a plurality of host computers 100, a management server 200, a storage system 300b and an external storage system 400. The greater part of this configuration is the same as the configuration of the first embodiment, and only the difference between the two is now explained.

The difference with the data processing system 900 shown in FIG. 1 is the existence of the external storage system 400, a memory 320b in a controller 305b of a storage system 300b has an external volume mapping table 325 and an external volume mapping table 326, the storage system 300b has an interface 392 for connection with the external storage system 400, a storage region configuring a pool area 362b is formed by a storage region of the external storage system 400 being virtually mapped thereto, and an interface 291b of the management server is connected to the storage system 300b and the external storage system 400 via the management network MN 520.

Further, in FIG. 12, a switch 500 is specified in the SAN 540. This is in order to clearly differentiate the connection of the host computer 100 and storage system 300b and the connection of the storage system 300b and external storage system 400.

Although there is only one external storage system 400 in the present embodiment, there may be a plurality of external storage systems. Further, the local area network LAN 510, management network MN 520 and storage area network SAN 540 may be of the same network.

The external storage system 400 functions as an external storage device of the storage system 300b. An external storage device is a storage device that is connected to the storage system and which retains a storage region when the storage system is to retain a virtual volume. The external storage system 400 has a controller 405, a logical volume 450, an interface 490 for connection with the storage area network SAN 540, and an interface 491 for connection with the management network MN 520. These respective constituent elements are mutually connected via a bus 480.

The controller 405 has a CPU 410 and a memory 420. Further, the memory 420 stores data and programs to be used by the CPU 410 upon executing various types of processing.

In the storage system 300b, the difference with the storage system 300 shown in FIG. 1 is the existence of an external volume mapping table 325 and an external volume mapping table 326, that it has an interface 392 for connection with the external storage system, and the storage region configuring the pool area 362b is virtually mapped to the storage region of the external storage system 400.

The external volume mapping table 325 is a table for showing which storage region of the external storage system 400 corresponds to the disk ID of the pool area 362b of the storage system 300b. The volume mapping table 325 is configured from four columns; namely, a disk ID 3250 of the storage system 300b, a column 3251 representing an external port WWN 392 as the identifier of a port connecting the storage system 300b and the external storage system 400, a device ID 3252 representing the external storage system, and a column 3253 representing the LUN of the external logical volume.

The external volume management program 326 is a program to be executed by the CPU 310, and is a management program for making the logical volume 450 of the external storage system 400 the storage region configuring the pool area 362b.

(2-2) Explanation of Data Processing Procedures

The greater part of the operation in the present embodiment is the same operation as the first embodiment, and only the difference between the two is now explained. In the present embodiment, prior to the procedures for executing data migration (sequence illustrated in FIG. 7), it is necessary to prepare the logical volume 450 of the external storage system 400 to be available as the storage region of the pool area of the storage system 300b.

Figure 14:
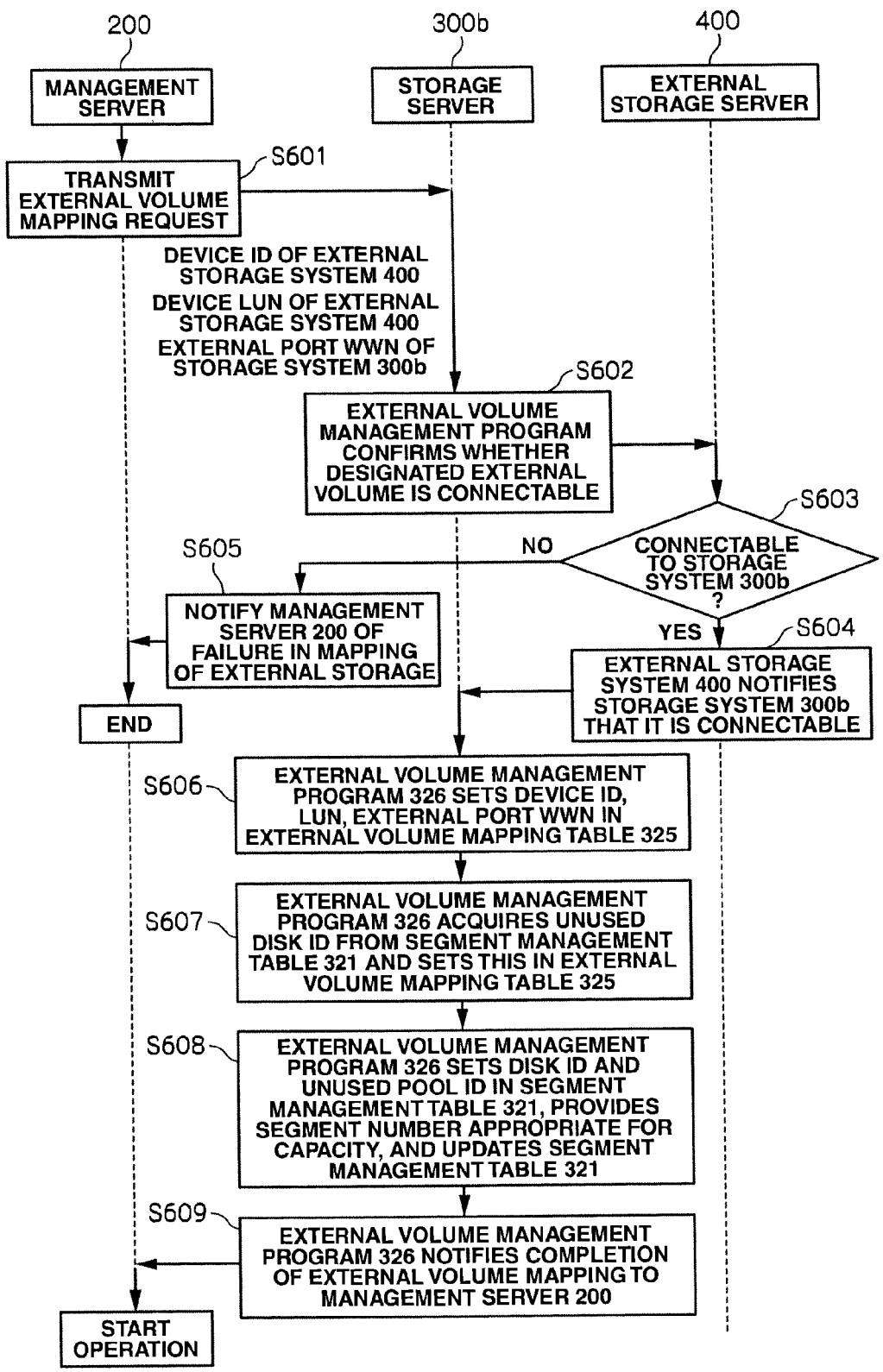
FIG. 14 is a diagram showing the procedures for mapping the external volume to the storage region of the pool area in the second embodiment.

FIG. 14 shows the procedures for mapping the external volume 450 as the pool area 362b of the storage system 300b. Foremost, at step S601, the management server 200 transmits to the storage system 300b a request for mapping the external volume 450 as the pool area 362b. Here, the volume management program 223 transmits to the storage system 300b the device ID of the external storage system 400, the LUN of the volume to be mapped with the external storage system 400, and a port WWN of a port for externally connecting the storage system 300b to the external storage system.

At step S602, the external volume management program 326 confirms with the storage system 400 regarding whether the designated volume is connectable to the storage system 300b.

At step S603, the external storage system 400 confirms whether it is connectable to the storage system 300b. When it is connectable, at step S604, it notifies such connectability to the storage system 300 and proceeds to step S606. When it is not connectable, at step S605, it notifies the management server 200 to the effect that external volume mapping is not possible. As a method of notifying such mapping impossibility, for instance, an error message may be displayed on a display device (not shown) of the management server 200, or an alarm may be raised with a speaker (not shown) of the management server 200. As a result, the user will be able to handle the situation adequately.

At step S606, the external volume management program 326 sets the values designated by the management server 200 to the external port WWN column 3251, device ID column 3252 and LUN column 3253 of the external logical volume in the external volume mapping table 325.

At step S607, the external volume management program 326 acquires an unused disk ID from the segment management table 321, and sets a value to the disk ID column 3250 of the external volume mapping table 325.

At step S608, the external volume management program 326 sets this disk ID and unused pool ID to the disk ID column 3211 and pool ID column 3210 of the segment management table 321, further provides a segment number appropriate for the capacity, sets a value to the segment number column 3212, and updates the segment management table 321.

At step S609, the external volume management program 326 notifies the completion of the external volume mapping to the management server 200. After this processing, the ordinary operation is commenced. Procedures for subsequently performing data migration are the same as the sequence illustrated in FIG. 7.

As a result of performing the foregoing processing, the reservation and release of the destination area during data migration between a storage system retaining a pool area for assigning a segment to a dynamically capacity-expansible logical volume and an external storage system connected to such storage system and having such pool area will be enabled, and the failure during data migration can be prevented thereby.

(3) Third Embodiment (3-1) System Configuration

Figure 15:
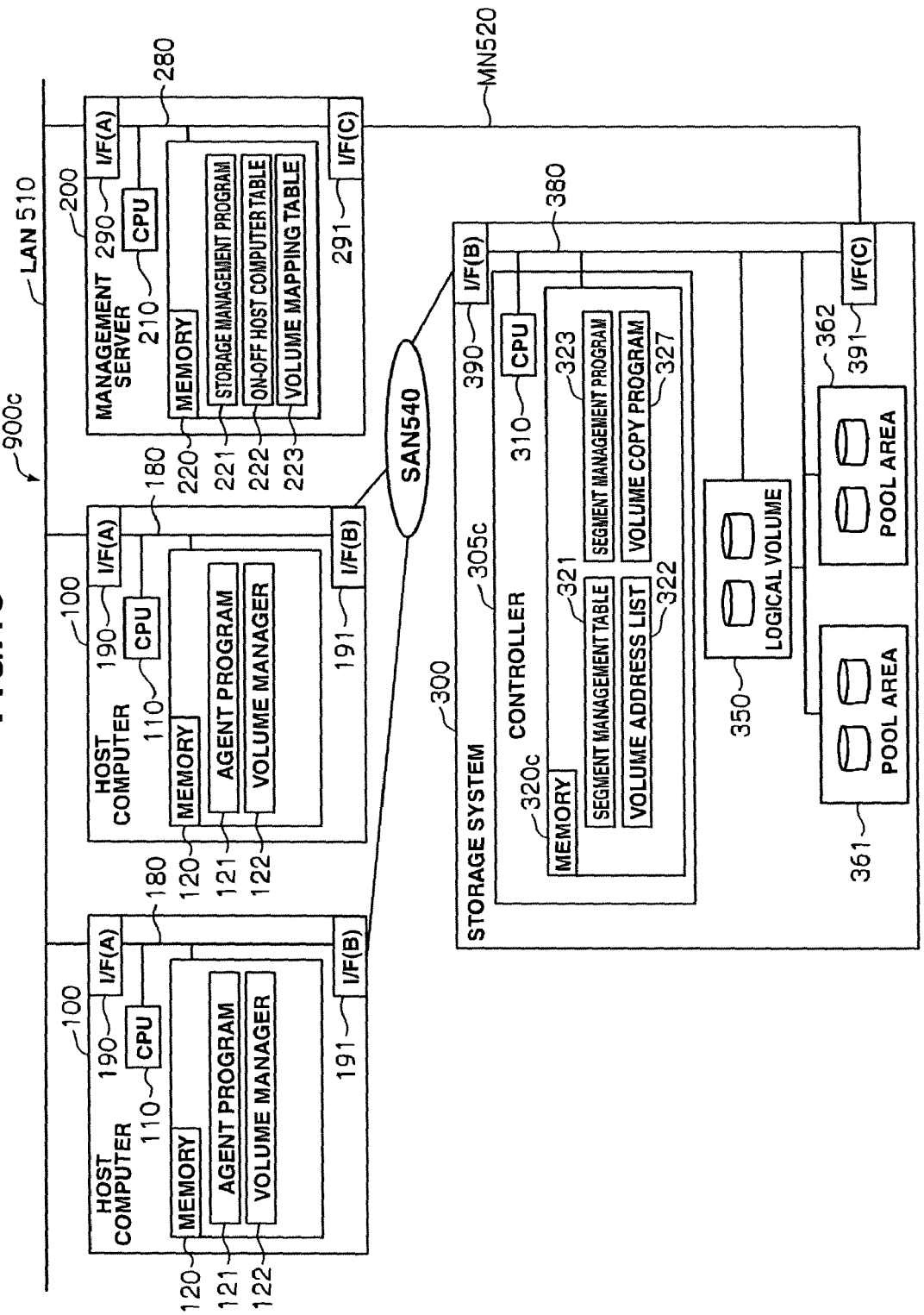
FIG. 15 is a diagram showing the system configuration in the third embodiment.

FIG. 15 is an explanatory diagram showing the configuration of a data processing system 900c in the third embodiment.

This data processing system 900c has a plurality of host computers 100, a management server 200, and storage system 300c. The greater part of this configuration is the same as the configuration of the first embodiment, and only the difference between the two is now explained. The difference with the data processing system 900 shown in FIG. 1 is that the memory 320c in the storage system 300c does not have a data migration program 324, but has a volume copy program 327.

(3-2) Explanation of Data Processing Procedures

The greater part of the operation in the present embodiment is the same operation as the first embodiment, and only the difference between the two is now explained. The difference in the processing steps among the procedures in FIG. 7 of the first embodiment is that S105 for requesting the execution of data migration and S106 for executing data migration are changed to SS105 for requesting the execution of volume copy and SS106 for executing volume copy.

Figure 16:
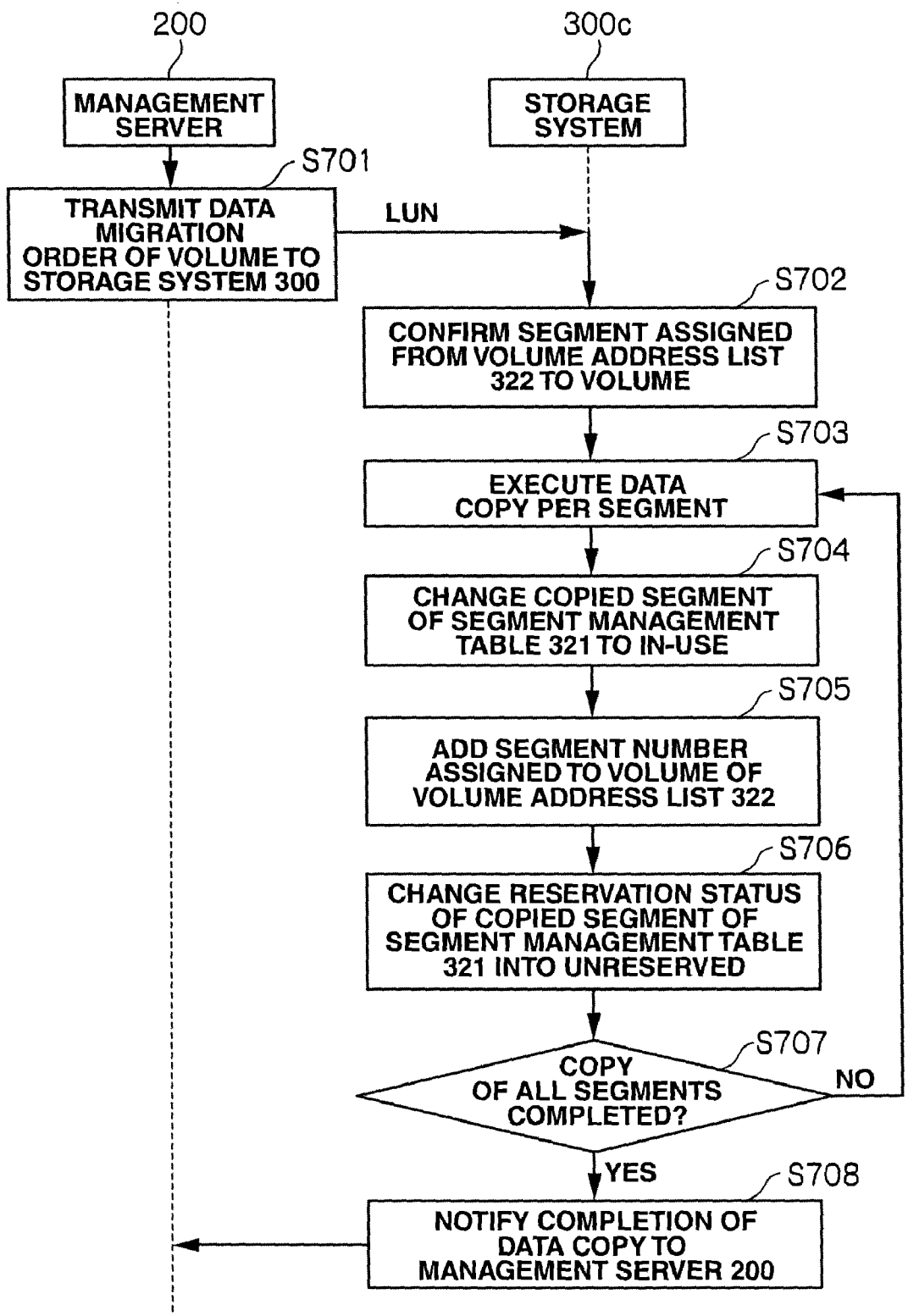
FIG. 16 is a diagram showing the volume copy processing procedures in the third embodiment.

FIG. 16 shows the processing procedures of volume copy (flow SS105, flow SS106) in the third embodiment. Foremost, at step S701, the management server 200 transmits to the storage system 300 a volume copy order of the logical volume. Here, the management server 200 transmits to the storage system 300 the LUN of the logical volume to perform the copy.

At step S702, the volume copy program 327 checks the segment assigned to the logical volume from the volume address list 322 in order to confirm the data to be copied.

At step S703, the volume copy program 327 executes data copy for each segment. The pool area of the copy destination is the area reserved at step S404.

At step S704, the segment management program 323 changes the segment number of the copied segment in the segment management table 321 to in-use (="1").

At step S705, the segment management program 323 adds the segment number assigned to the logical number of the volume address list 322.

At step S706, the segment management program 323 changes the reservation status of the copied segment in the segment management table 321 to unreserved (="0").

At step S707, the volume copy program 327 checks whether the copy of all data of the logical volume is complete. If complete, the routine proceeds to step S708. If the copy of all data is not complete, the routine returns to step S703.

At step S708, the volume copy program 327 notifies the completion of volume copy to the management server 200.

As a result of the foregoing processing, the reservation of the copy destination area during the data copy among a plurality of pool areas will be enabled for assigning a segment to a dynamically capacity-expansible logical volume, and the failure during data copy can be prevented thereby.

(4) Fourth Embodiment (4-1) System Configuration

Figure 17:
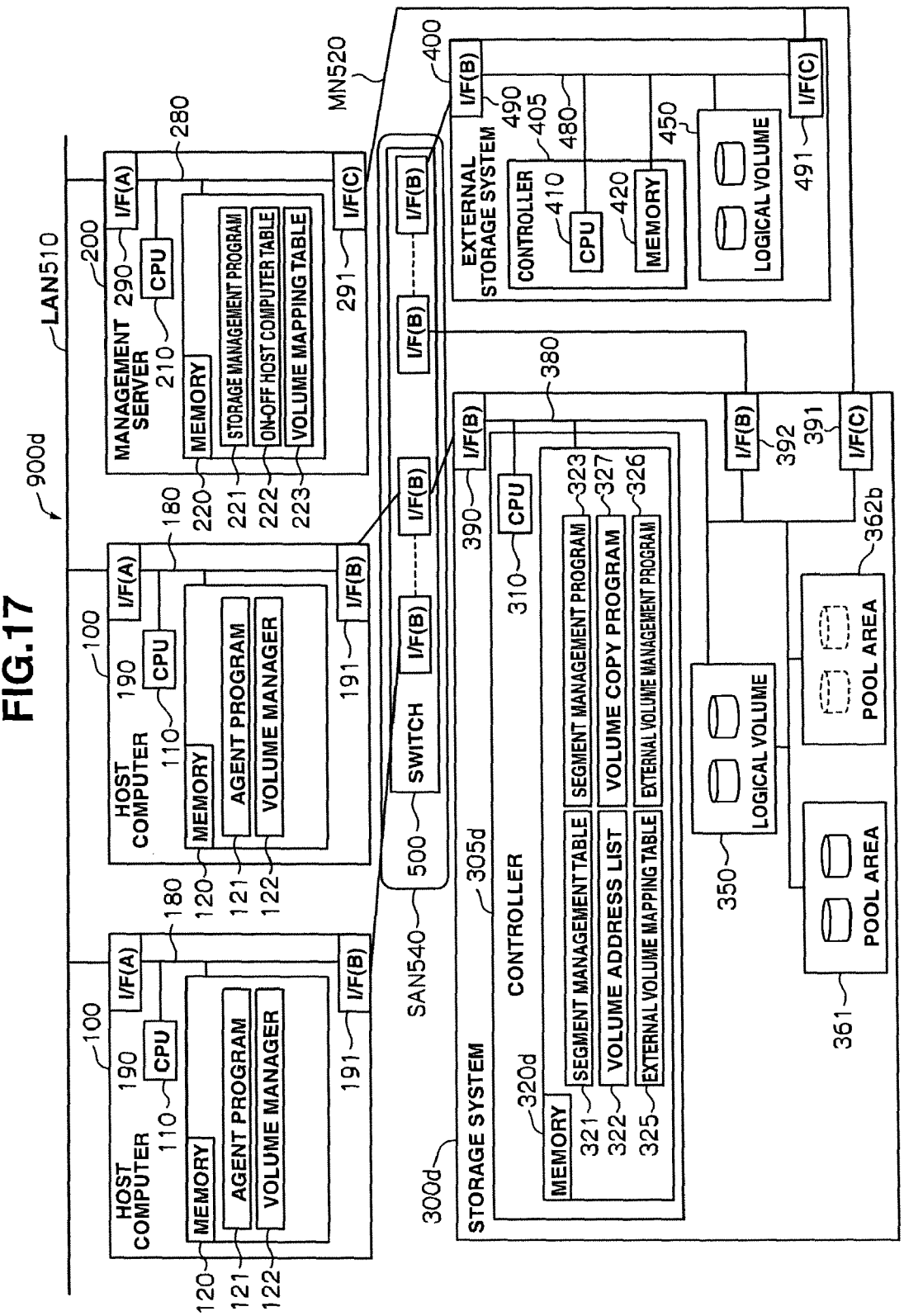
FIG. 17 is a diagram showing the system configuration in the fourth embodiment.

FIG. 17 is an explanatory diagram showing the configuration of a data processing system 900d in the fourth embodiment.

This data processing system 900d has a plurality of host computers 100, a management server 200, a storage system 300d and an external storage system 400. The greater part of this configuration is the same as the configuration of the first embodiment, and only the difference between the two is now explained. The difference with the data processing system 900b shown in FIG. 12 is that the memory 320b in the storage system 300b does not have a data migration program 324, but has a volume copy program 327.

(4-2) Explanation of Data Processing Procedures

The operation of the present embodiment is realized by combining the operations of the second embodiment and third embodiment. The procedures of such combination are now explained. Foremost, mapping of the external logical volume is performed in order to make the logical volume of the external storage system 400 the storage region of the pool area of the storage system 300d (processing from step S601 to step S609 of FIG. 14). Next, the connection status of the host computer 100 and logical volume is confirmed (step S101 and step S102 of FIG. 7; detailed procedures are step S201 to step S205 of FIG. 8). Next, reservation of the pool area is made prior to the execution of data copy (step S103 and step S104 of FIG. 7; detailed procedures are step S301 to step S307 of FIG. 9 and FIG. 10 and step S401 to step S407 of FIG. 10). The volume is copied thereafter (step S701 to step S708 of FIG. 16). The processing is realized with the foregoing procedures.

(5) Fifth Embodiment (5-1) System Configuration

Figure 18:
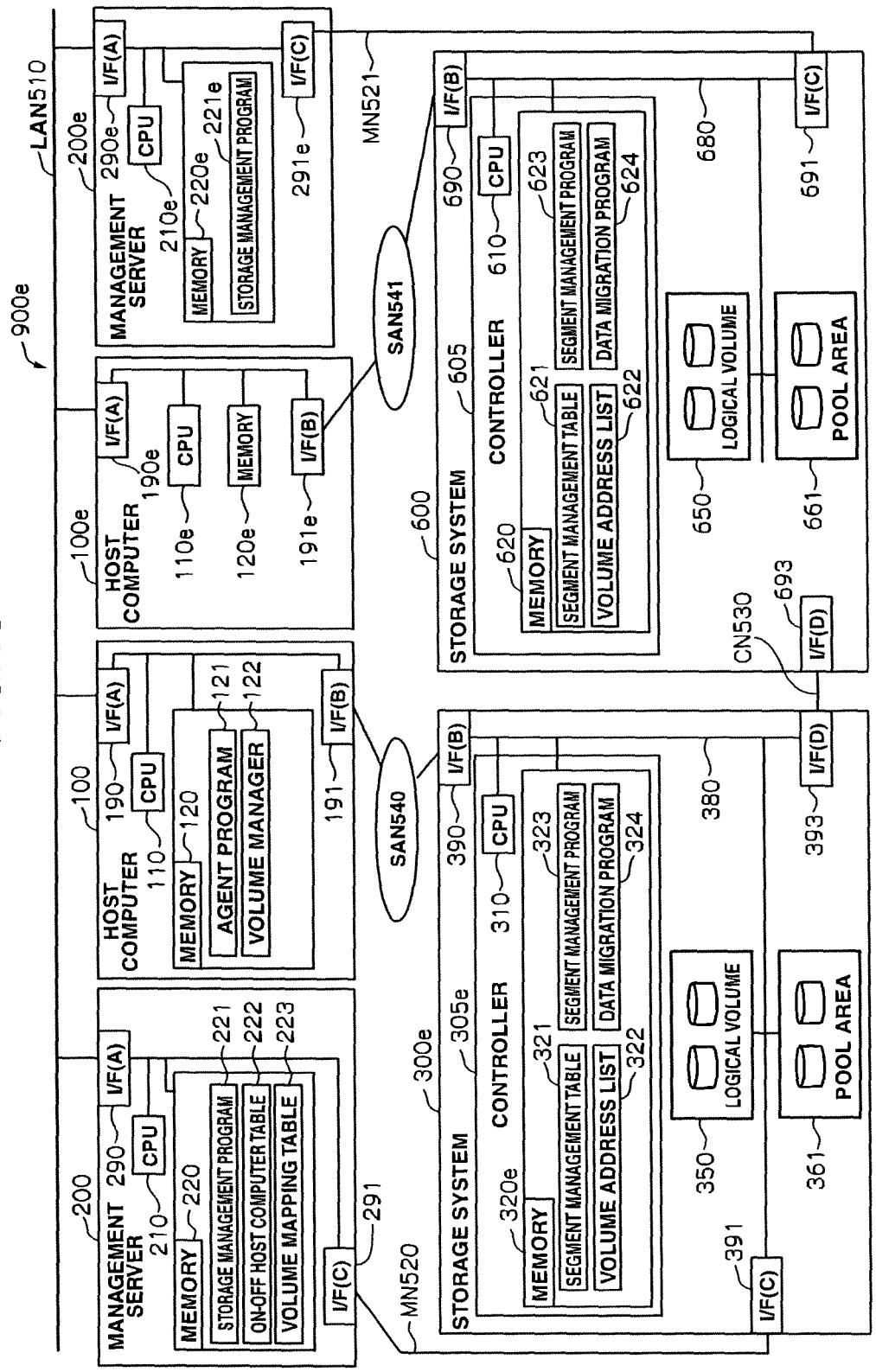
FIG. 18 is a diagram showing the system configuration in the fifth embodiment.

FIG. 18 is an explanatory diagram showing the configuration of a data processing system 900e in the fifth embodiment.

This data processing system 900e has a plurality of host computers 100, 100e, management servers 200, 200e, and storage systems 300, 600. The host computer 100 and storage system 300 are respectively connected to a storage area network SAN 540. A management server 200 is connected to the storage system 300 via a management network MN 520. Further, the host computer 100 and management server 200 are respectively connected to a LAN 510.

Further, the host computer 100e and storage system 600 are respectively connected to a storage area network SAN 541. A management server 200e is connected to the storage system 600 via a management network MN 521. Moreover, the host computer 100e and management server 200e are respectively connected to a LAN 510. In addition, the storage system 300 and storage system 600 are connected via a data copy network CN 530.

Although there is only one host computer 100 connected to the storage system 300 in the present embodiment, a plurality of host computers may be connected. Further, although there is only one host computer 100e connected to the storage system 600, a plurality of host computers may be connected. Moreover, the SAN 540 and SAN 541 may be a single network, and the LAN 510, management networks MN 520, MN 521, copy network CN 530 and storage area networks SAN 540, 541 may be of the same network. In addition, only one management server 200, 200e may be connected to the storage systems 300, 600.

The respective devices configuring the present data processing system are basically the same as the devices configuring the first embodiment, and only the difference between the two is now explained. The difference with the respective devices of the data processing system 900 illustrated in FIG. 1 is that the storage system 300 is connected to the storage system 600 with the data copy network CN 530. The connection relationship of the host computer 100, management server 200 and storage system 300 is the same as the first embodiment.

The host computer 100e has a CPU 110e, a memory 120e, an interface 190e for connection with the local area network LAN 510, and an interface 191*e* for connection with the storage area network SAN 541. These respective constituent elements are mutually connected via a bus 180*e*. Functions of the host computer 100*e* are realized by the CPU 110*e* executing programs. The memory 120*e* stores data and programs to be used by the CPU 110*e*.

The host computer 100*e* also has a data input device for a user of the host computer to input data and a display device for a user of the host computer to present information, but these are not illustrated since they do not relate directly to the present invention.

The management server 200*e* has a CPU 210*e*, a memory 220*e*, an interface 290*e* for connection with the local area network LAN 510, and an interface 291*e* for connection with the management network MN 521. These respective constituent elements are mutually connected via a bus 280*e*. Functions of the management server 200*e* are realized by the CPU 210 executing programs.

The memory 220 stores data and programs to be used by the CPU 210. In particular, the memory 220 has a storage management program 221*e*. The storage management program 221*e* is a program to be executed by the CPU 210*e*.

The management server 200*e* also has a data input device for a user of the management server to input data and a display device for a user of the management server to present information, but these are not illustrated since they do not relate directly to the present invention.

(5-2) Explanation of Data Processing Procedures

Figure 19:
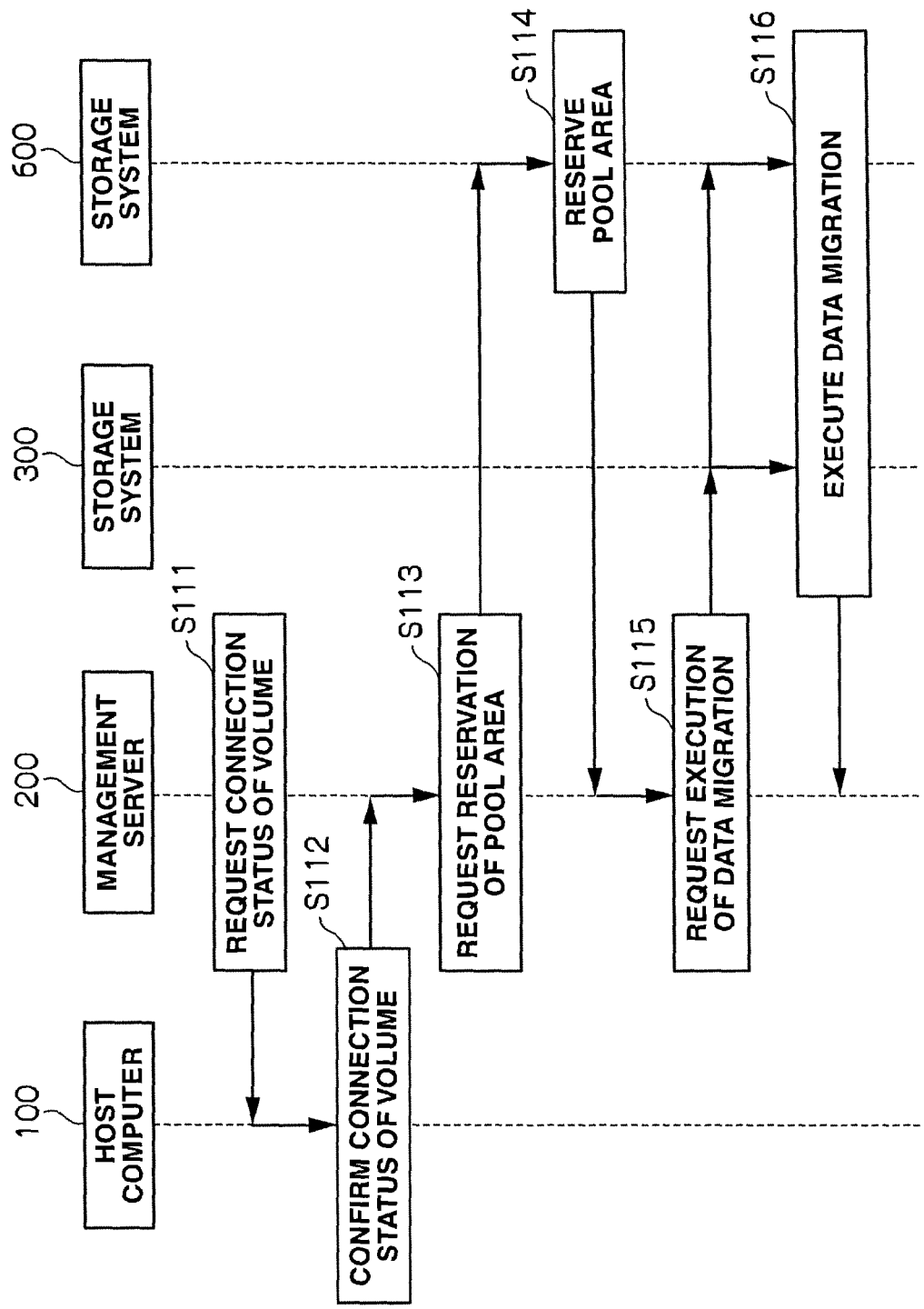
FIG. 19 is a diagram showing the outline of an operational sequence among the respective devices in the fifth embodiment.

FIG. 19 shows the outline of a sequence among the respective devices. Foremost, in flow S111, the management server 200 makes an inquiry to the host computer 100 regarding the connection status of the volume in order to acquire the connection status of the migration source volume and host computer for performing data migration. Next, in flow S112, the host computer 100 checks the connection status of the volume and transmits the result to the management server 200.

Next, in flow S113, the management server 200 calculates the area required for data migration based on the result of the connection status of the volume from the host computer 100, and transmits an area reservation request to the storage system 600.

Next, in flow S114, the storage system 600 reserves the pool area in a size requested by the management server 200.

Next, in flow S115, the management server 200 sends a data migration request of the logical volume to the storage system 300 and storage system 600. Finally, in flow S116, the storage system executes data migration of the logical volume. After the completion of data migration, if there is an unused reserved area, the reservation is cancelled and the area is released. Each flow is now explained in detail below. However, flow S111 and flow S112 are the same as flow S101 and flow S102 of FIG. 7, and the explanation thereof is omitted.

Figure 20:
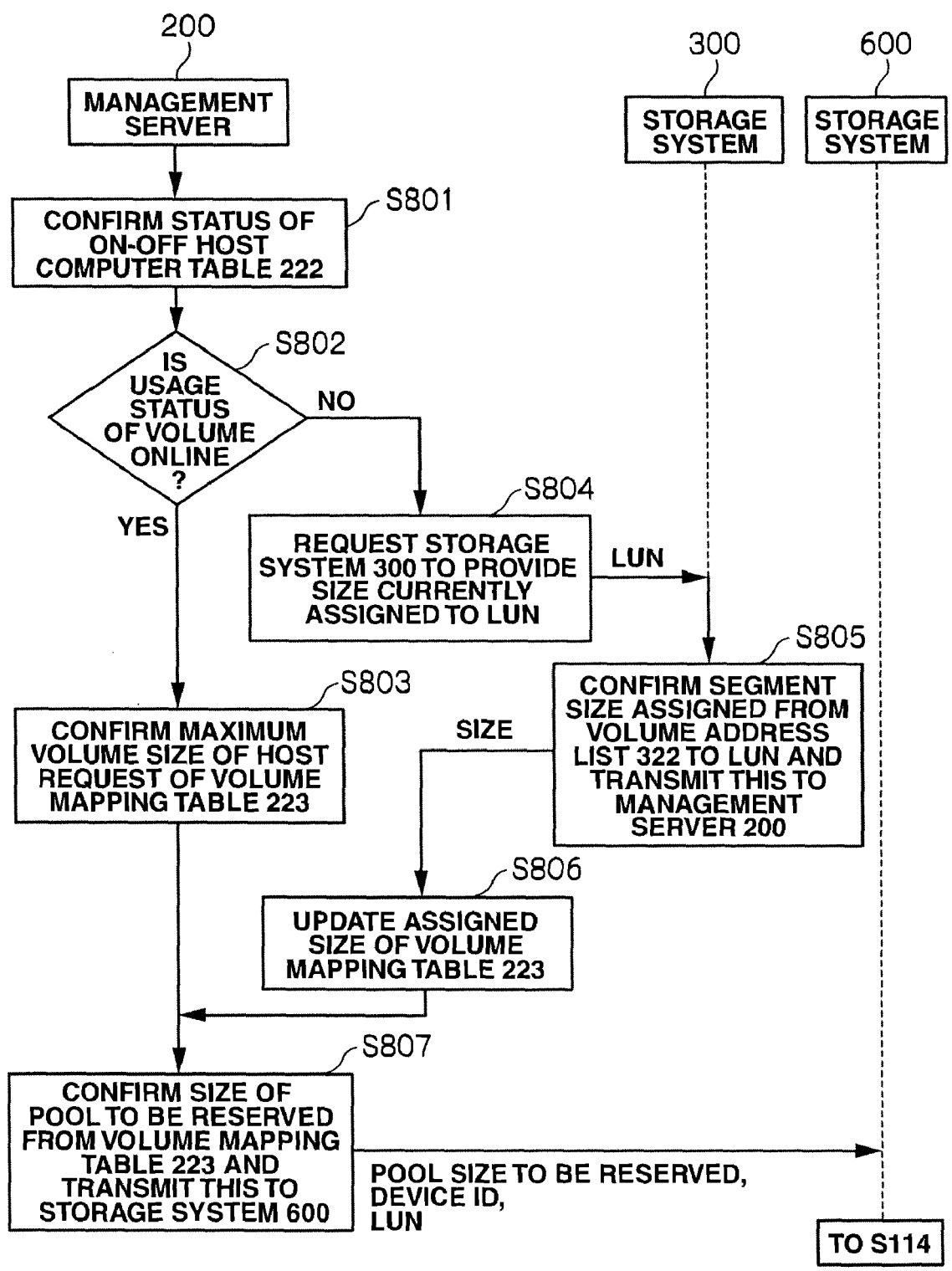
FIG. 20 is a diagram showing the procedures for transmitting a reservation order of a pool area from the management server to the storage system.

Next, details of flow S113 for requesting the reservation of the pool area are shown in FIG. 20. Foremost, at step S801, the management server 200 checks the connection status of the volume from the connection status volume 2223 of the volume of the on-off host computer table 222.

At step S802, whether the connection status of the volume is online or offline is determined. If the usage status of the volume is online, the routine proceeds to step S803. If it is offline, the routine proceeds to step S804.

At step S803, the storage management program 221 confirms the area size to be reserved from the column 2233 representing the maximum size of the host request of the volume mapping table 223. Thereafter, the routine proceeds to step S807.

At step S804, the storage management program 221 transmits a request to the storage system 300 for acquiring the size currently assigned to the volume of data migration. Here, the storage management program 221 transmits to the storage system 300 the LUN for identifying the volume.

At step S805, the segment management program 323 confirms the segment size assigned from the LBA end address 3223 of the LUN of the volume address list 322, and transmits the assigned segment size to the management server 200.

At step S806, the storage management program 221 updates the value of the column 2234 of the assigned segment size of the volume mapping table 223 into a value transmitted from the segment management program 323.

At step S807, the storage management program 221 confirms the area of the volume to be reserved, and transmits a pool area reservation request to the storage system 600. Here, the storage management program 221 transmits to the storage system 600 the device ID and LUN of the volume to perform data migration and the size of the pool area to be reserved.

Figure 21:
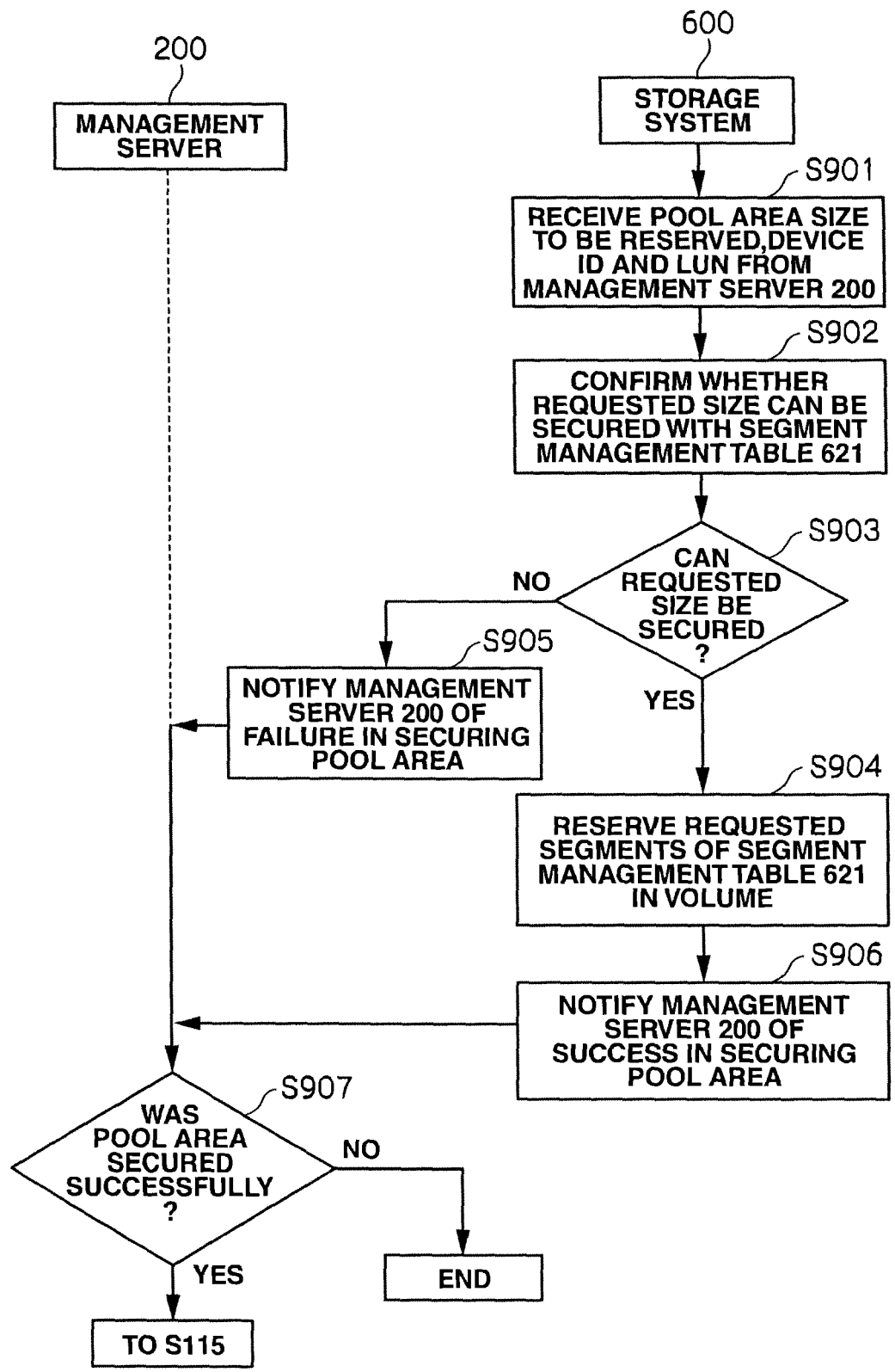
FIG. 21 is a diagram showing the reservation procedures of a pool area with the storage system in the fifth embodiment.

Next, details of flow S114 for executing the reservation of the pool area are shown in FIG. 21. Foremost, at step S901, the storage system 600 receives from the storage management program 221 the pool size to be reserved and the device ID and LUN to perform data migration.

At step S902, the segment management program 623 calculates the sum of the segment sizes of an unused state in the pool area having a pool ID separate from the pool area that is currently being used from two pieces of information; namely, the size requested by the management server 200 and the LUN from the segment management table 621, and checks whether the size requested from the storage management program 221 can be secured.

At step S903, if the sum of the segment sizes of an unused status is greater than the size requested from the storage management program 221, the requested size is determined to be securable, and the routine proceeds to step S904. If not, the requested size is determined to be not securable, and the routine proceeds to step S905.

At step S904, in order to reserve segments worth the area capable of satisfying the requested size, the segment management program 623 updates the status to in-reservation (="1") in an amount of the requested size of the column 3216 representing the reservation status for data migration of the segment management table 621, and further inputs the device ID and LUN representing the volume of data migration in the column 3217 representing the reserved logical volume. Thereafter, at step S906, the segment management program 623 transmits a notice to the management server 200 indicating the successful reservation of the pool area.

At step S905, the segment management program 623 transmits a notice to the management server 200 indicating the failure in securing the pool area.

At step S907, the storage management program 221 receives the notice indicating whether the pool area could be secured, and determines whether the reservation is complete. If the reservation is complete, the routine proceeds to step S115. If not, the routine ends the data migration processing, and issues a warning to the user using the management server 200. The method of issuing the warning, for instance, may be conducted by displaying an error message on a display device (not shown) of the management server 200, or raising an alarm with a speaker (not shown) of the management server 200. As a result, the user will be able to handle the situation adequately.

Figure 22:
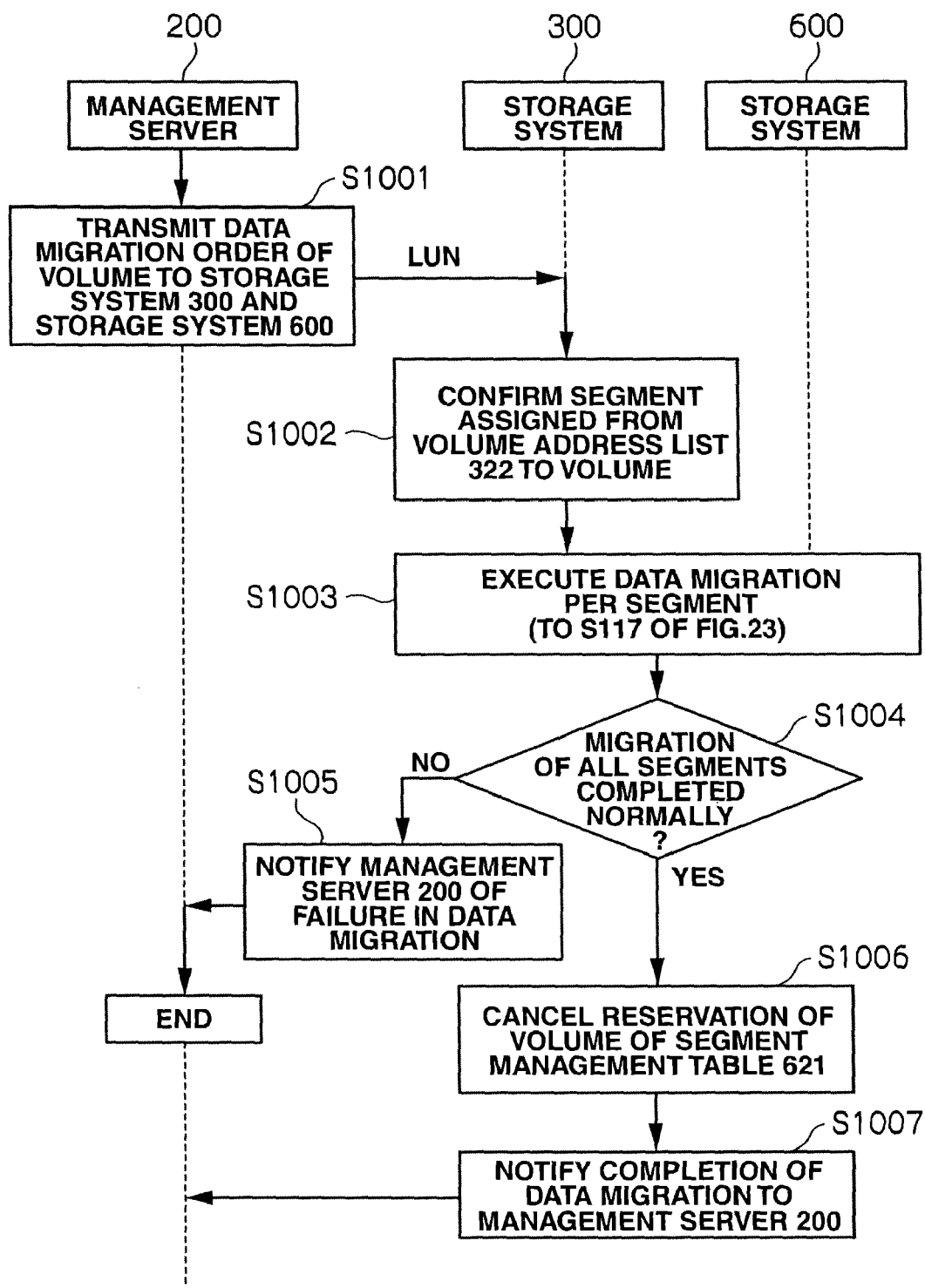
FIG. 22 is a diagram showing the data migration procedures in the fifth embodiment.

Next, details of flows S115 and S116 for requesting and executing data migration are shown in FIG. 22. At step S1001, the storage management program 221 transmits a data migration request of the volume to the storage system 600. Here, the storage management program 221 transmits the LUN to the storage system 300.

At step S1002, the data migration program 324 confirms the segment assigned to the volume from the volume address list 322. The data to be actually migrated is only the data of this segment.

At step S1003, data migration is commenced. Details of data migration are explained at step S117 in FIG. 23.

At step S1004, whether the data migration was completed normally is checked. If migration of all data has been completed normally, the routine proceeds to step S1006. If migration is not complete, the routine proceeds to S1005 and completes the data migration processing, and issues an alarm to the user using the management server 200. The method of issuing the warning, for instance, may be conducted by displaying an error message on a display device (not shown) of the management server 200, or raising an alarm with a speaker (not shown) of the management server 200. As a result, the user will be able to handle the situation adequately.

At step S1006, the segment management program 623 changes the values of the in-reservation column 3216 and reservation logical volume column 3217 in relation to the segment management table 621 from "1" to "0". Thereby, reservation for the data migration of the volume is cancelled, and the segment will be released. At step S1007, the data migration program 624 transmits a notice to the management server 200 indicating the completion of data migration.

Figure 23:
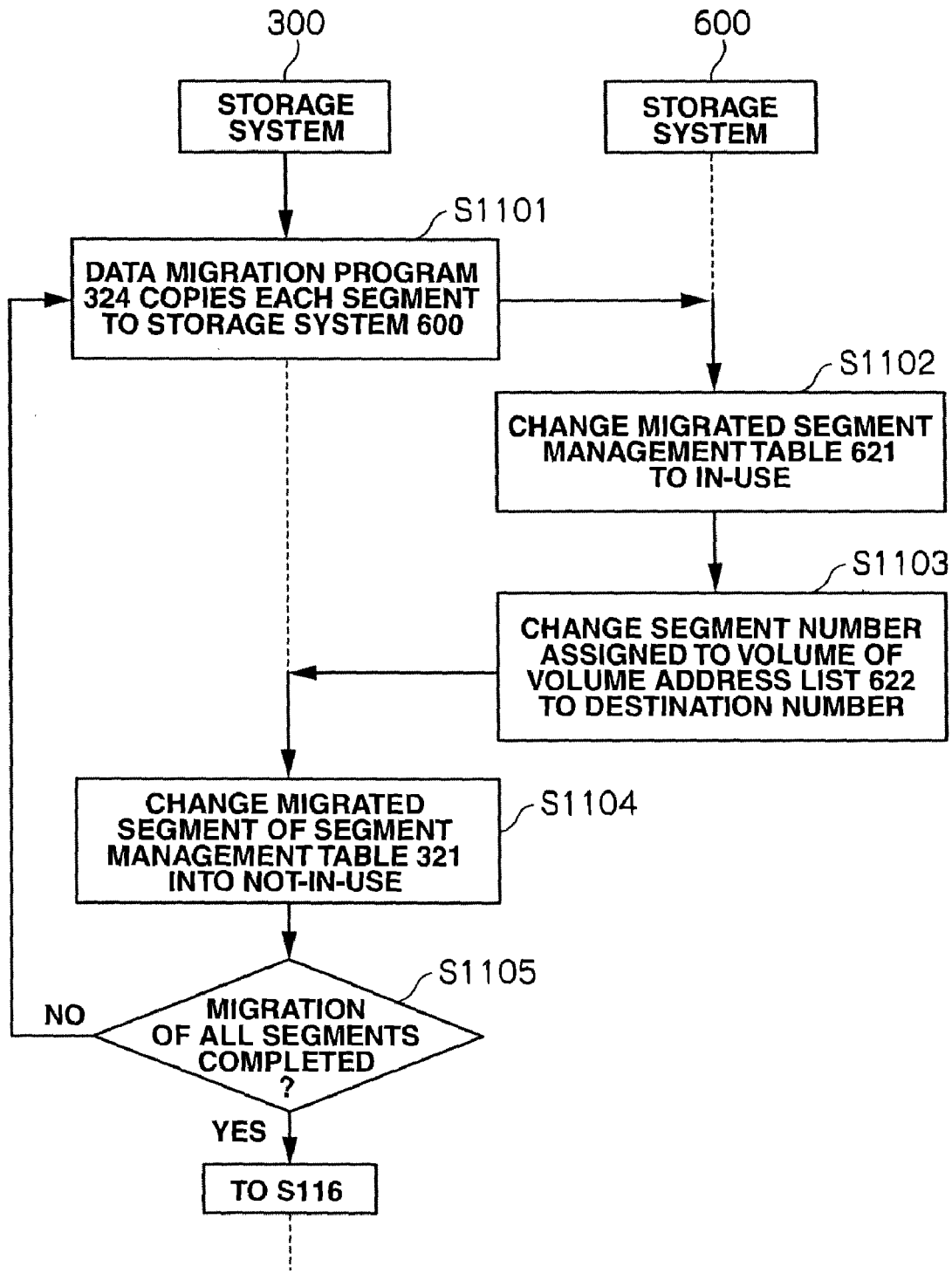
FIG. 23 is a diagram showing the table renewal procedures of the respective storage systems during data migration in the fifth embodiment.

Next, the method of updating tables of the respective storage systems during data migration is explained. As shown in FIG. 23, at step S1101, the data migration program 324 of the storage system 300 copies the respective segments to the storage system 600.

At step S1102, the data migration program 624 of the storage system 600 changes the usage column 3215 of the migrated segment number of the segment management table 621 to in-use (="1").

At step S1103, the data migration program 624 changes the value of the segment number column 3221 assigned to the volume of the volume address list 622 from the segment value before migration to the segment value after migration.

At step S1104, the segment management program 323 changes the usage status column 3215 of the segment number of the segment in the migration source data of the segment management table 321 to not-in-use (="0").

At step S1105, the data migration program 324 checks whether the migration of all data of the logical volume is complete. If complete, the routine proceeds to step S116. If the migration of all data is not complete, the routine returns to S1101.

As described above, in the fifth embodiment, the memory of the plurality of storage systems has a segment management table for managing the segment dynamically assigned to the logical volume, a volume address list showing the correspondence of the assigned segment and logical volume, a segment management program for managing the segment, and a data migration program for executing data migration.

Further, the memory of the management server has an on-off host computer table showing the connection relationship of the host computer and the volume, a volume mapping table showing the maximum volume capacity requested by the host, and a volume management program for managing the volume of the storage system.

And, by executing flows S111, S112, S113, S114, S115 and S116, the reservation and release of a destination area during data migration of a dynamically capacity-expansible logical volume will be enabled, and the failure during data migration can be prevented thereby.

(6) Sixth Embodiment
(6-1) System Configuration

Figure 24:
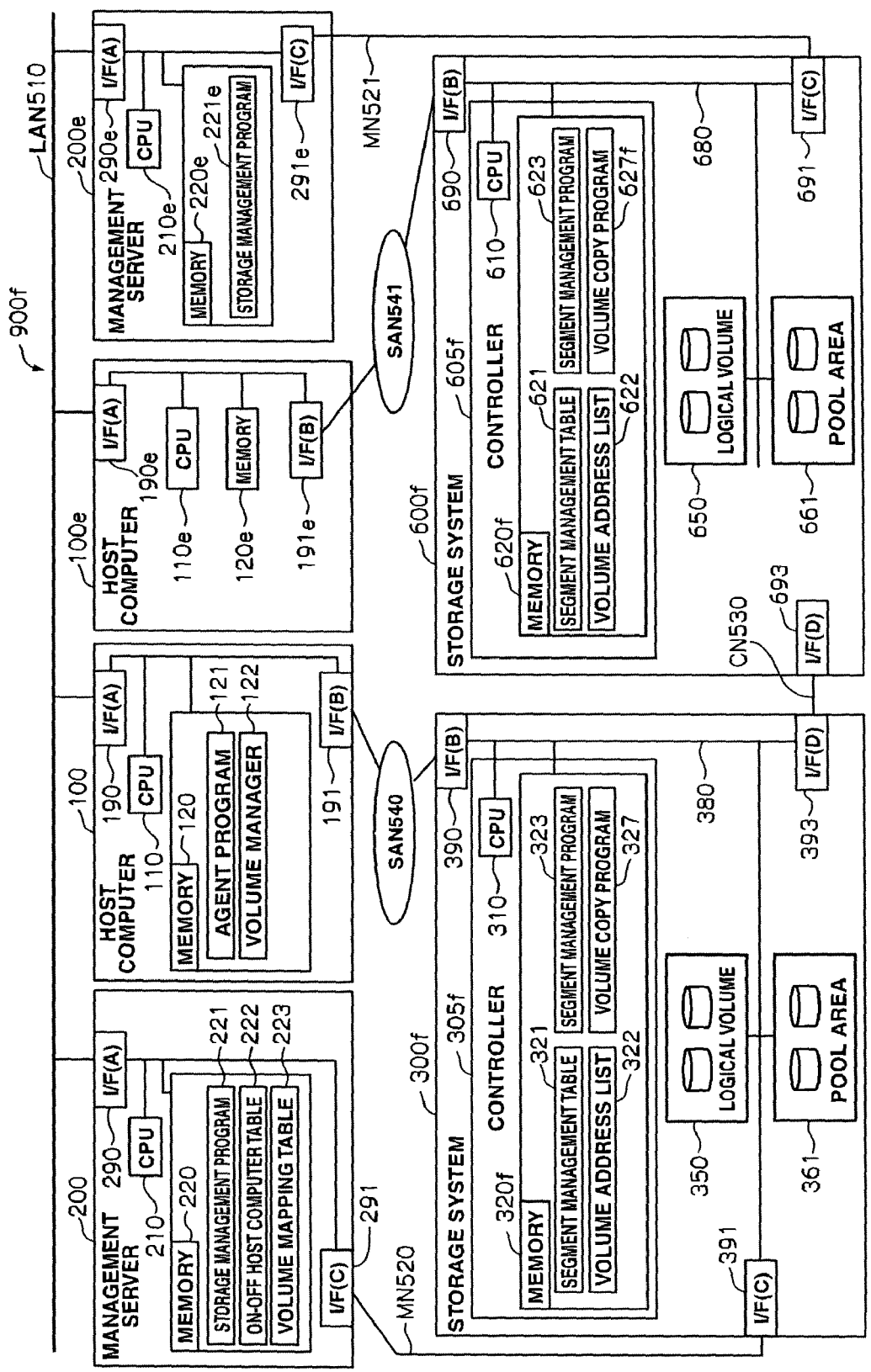
FIG. 24 is a diagram showing the system configuration in the sixth embodiment.

FIG. 24 is an explanatory diagram showing the configuration of a data processing system 900f in the sixth embodiment.

This data processing system 900f has a plurality of host computers 100, 100e, management servers 200, 200e and storage systems 300f, 600f. The greater part of this configuration is the same as the configuration of the fifth embodiment, and only the difference between the two is now explained. The difference with the data processing system 900e shown in FIG. 18 is that the memory 320f of the storage system 300f does not have a data migration program 324, but has a volume copy program 327.

(6-2) Explanation of Data Processing Procedures

The greater part of the operation of the present embodiment is the same as the operation of the fifth embodiment, and only the difference between the two is now explained. The difference in the processing steps among the procedures in FIG. 19 of the fifth embodiment is that S115 for requesting the execution of data migration and S116 for executing data migration are changed to SS115 for requesting the execution of volume copy and SS116 for executing volume copy.

Figure 25:
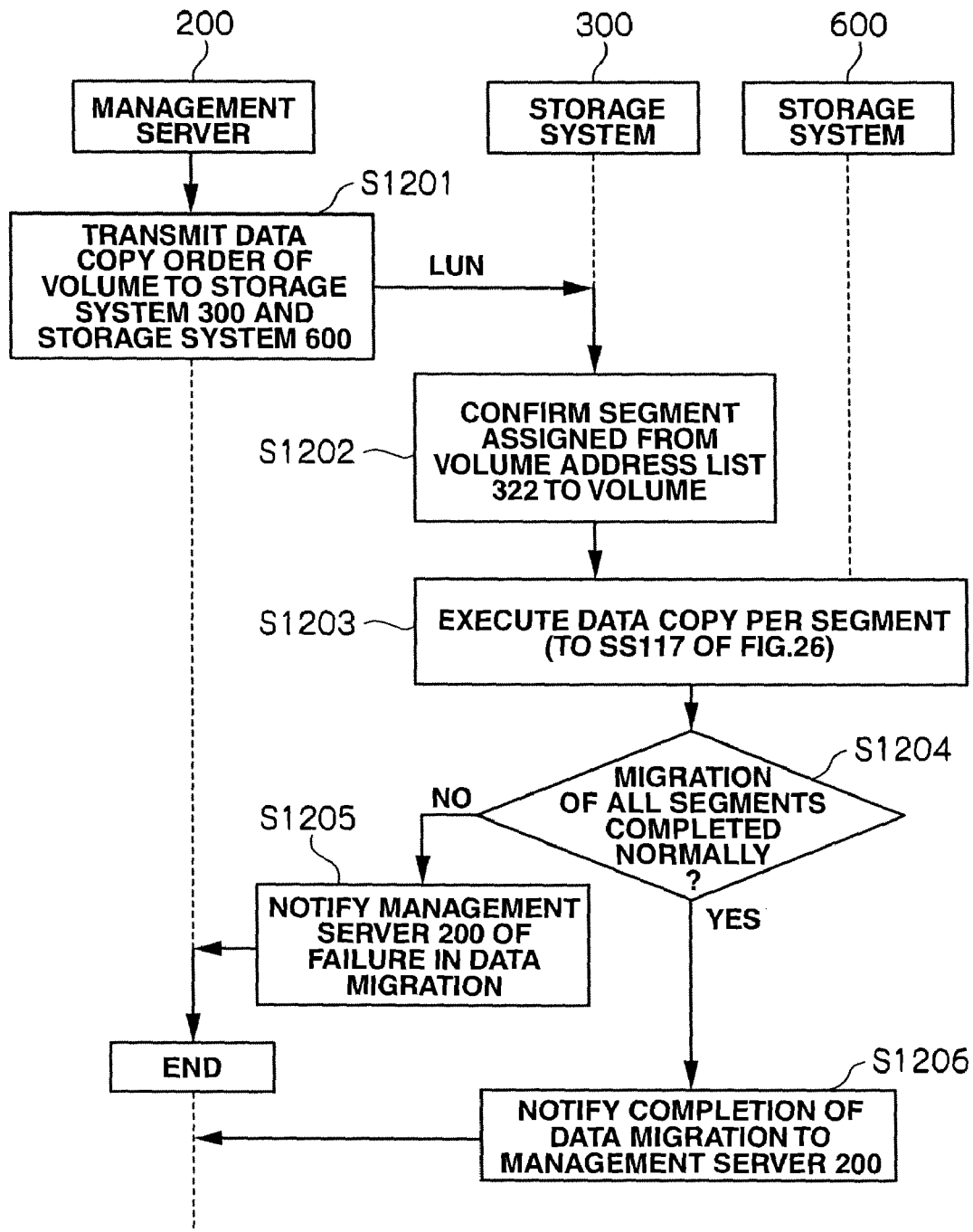
FIG. 25 is a diagram showing the volume copy processing procedures in the sixth embodiment.

FIG. 25 shows the processing procedures of volume copy (flow SS115, flow SS116) in the sixth embodiment. Foremost, at step S1201, the management server 200 transmits to the storage system 300 a volume copy order of the logical volume. Here, the management server 200 transmits to the storage system 300 the device ID and LUN of the logical volume to perform the copy.

At step S1202, the volume copy program 327 checks the segment assigned to the logical volume from the volume address list 322 in order to confirm the data to be copied.

At step S1203, data copy is commenced. Details of data copy are explained at step SS117 of FIG. 26. The pool area of the copy destination is the area reserved at step S904.

At step S1204, whether the data copy was completed normally is checked. If copy of all data has been completed normally, the routine proceeds to step S1206. If copy is not complete, the routine proceeds to S1205 and completes the data copy processing, and issues an alarm to the user using the management server 200. The method of issuing the warning, for instance, may be conducted by displaying an error message on a display device (not shown) of the management server 200, or raising an alarm with a speaker (not shown) of the management server 200. As a result, the user will be able to handle the situation adequately.

At step S1206, the volume copy program 327 transmits a notice to the management server 200 indicating the completion of volume copy.

Figure 26:
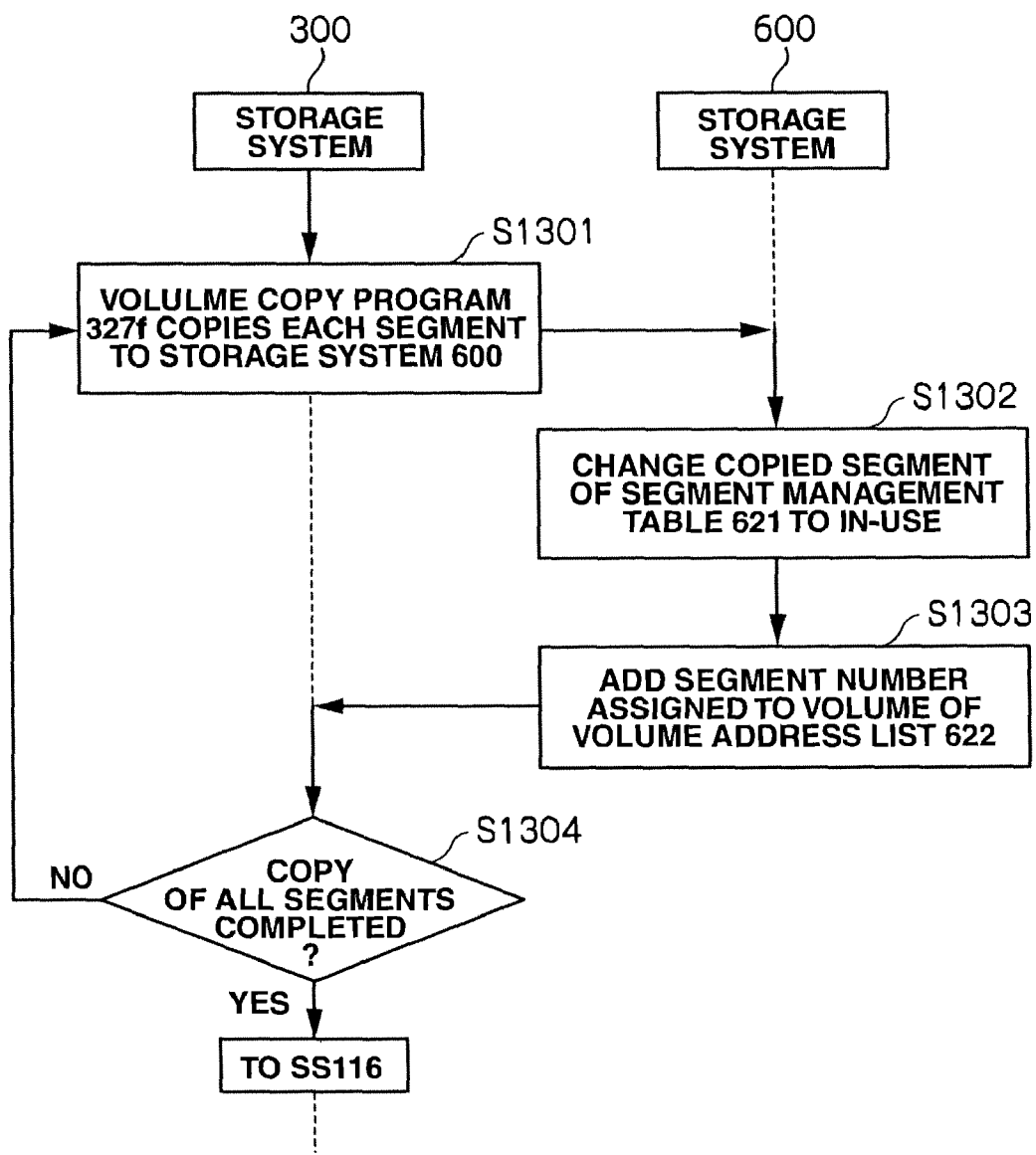
FIG. 26 is a diagram showing the table renewal procedures of the respective storage systems during data copy in the sixth embodiment.

Next, the method of updating tables of the respective storage systems during data copy is explained. As shown in FIG. 26, at step S1301, the data migration program 324 of the storage system 300 copies the respective segments to the storage system 600.

At step S1302, the volume copy program 627f of the storage system 600 changes the usage column 3215 of the migrated segment number of the segment management table 621 to in-use (="1").

At step S1303, the volume copy program 627f adds the segment number column 3221 assigned to the volume of the volume address list 622.

At step S1304, the volume copy program 327f checks whether the copy of all data of the logical volume is complete.

If complete, the routine proceeds to step SS116. If the copy of all data is not complete, the routine returns to S1301.

As a result of the foregoing processing, the reservation of the copy destination storage region during the data copy of a dynamically capacity-expansible logical volume among different storage systems will be enables, and the failure during data copy can be prevented thereby.

The invention claimed is:

1. A data processing system comprising:
a first storage system configured with a virtual logical volume that comprises a dynamically expandable volume;
a second storage system coupled to the first storage system through a data copy network;
a host computer configured to input data to the virtual logical volume; and
a management server coupled to the host computer, configured to manage the virtual logical volume,
wherein the first storage system comprises:
a first pool configured from a plurality of physical disks and comprising a plurality of segments of a first storage region each with a respective capacity,
wherein the first storage system is configured to assign one or more of the plurality of segments in the first pool as a current capacity to the virtual logical volume, in response to a request from the host computer to input data,
wherein the second storage system comprises:
a second pool configured from a plurality of physical disks and comprising a plurality of segments of a second storage region each with a respective capacity,
wherein the management server is configured to perform a migration of data comprising:
(A) confirming a connection status of the host computer and the virtual logical volume upon receiving a request from the host computer for migrating data corresponding to at least a part of the virtual logical volume, from the first storage region to the second storage region;
(B) transmitting to the first storage system, as a reservation capacity, when the host computer and the virtual logical volume are coupled, a maximum capacity of the data held in the one or more segments of the first storage region requested by the host computer to be assigned to the virtual logical volume for the migration, and transmitting to the first storage system, as the reservation capacity, if the host computer and the virtual logical volume are not coupled, the current capacity of the one or more segments of the first storage region which are currently assigned to the virtual logical volume,
wherein the first storage system is configured to reserve the second storage region, with a capacity based at least in part on the reservation capacity transmitted from the management server, and
wherein the first storage system is configured to execute a migrating of at least a portion of the data corresponding to the virtual logical volume from the first storage region to the second storage region, after the reservation of the second storage region.

2. The data processing system of claim 1, wherein the first storage system is configured to check for an unassigned segment existing in the second storage region, and release the unassigned segment after the data is migrated.

3. The data processing system of claim 2, wherein the first storage system is configured to calculate an unassigned capacity of the second storage region, and notify the management server that the reservation capacity cannot be secured when the reservation capacity transmitted from the management server cannot be secured.

4. The data processing system of claim 1, wherein the first storage system is configured to assign a segment of the second storage region to the virtual logical volume.

5. The data processing system of claim 1, wherein the first storage system comprises a mapping table for the second storage system.

6. The data processing system of claim 1, wherein the management server comprises:
a confirmation unit configured to confirm a connection status of the host computer and the virtual logical volume; and
a transmission unit configured to transmit to the first storage system a maximum capacity of the virtual logical volume preset as requested by the host computer.

7. The data processing system of claim 6, wherein the first data storage system further comprises:
a migration unit configured to migrate to the second storage region the data stored in the first storage region assigned to the virtual logical volume; and
a release unit configured to release the reservation of unused capacity when the unused capacity exists in the capacity reserved with the reservation unit after the data are migrated with the migration unit.

8. The data processing system of claim 7, wherein the migration unit is configured to copy the data stored in the first storage region assigned to the virtual logical volume to the second storage region.

9. The data processing system of claim 6, wherein the management server is configured to issue a warning if the maximum or current capacity is not secured.

10. A data processing system comprising:
a first storage system configured with a virtual logical volume that comprises a dynamically expandable volume;
a second storage system coupled to the first storage system through a data copy network;
a host computer configured to input data to the virtual logical volume; and
a management server coupled to the host computer, configured to manage the virtual logical volume,
wherein the first storage system comprises:
a first pool configured from a plurality of physical disks and comprising a plurality of segments each with a respective capacity;
wherein the second storage system comprises:
a second pool configured from a plurality of physical disks and comprising a plurality of segments each with a respective capacity,
wherein the first storage system is configured to assign one or more of the plurality of segments of a first storage region in the first pool as a current capacity to the virtual logical volume, in response to a request from the host computer to input data,
wherein the management server is configured to copy data in an operation comprising:
(A) confirming a connection status of the host computer and the virtual logical volume upon receiving a request from the host computer for copying data corresponding to the virtual logical volume, from the first storage region to a second storage region in the second pool;
(B) transmitting to the first storage system, as a reservation capacity, if the host computer and the virtual logical volume are coupled, a maximum capacity of the data held in the one or more segments of the first storage region requested by the host computer to be assigned to the virtual logical volume for the copying, and transmitting to the first storage system, as the reservation capacity, if the host computer and the virtual logical volume are not coupled, the current capacity of the one or more segments of the first storage region which are currently assigned to the virtual logical volume, wherein the first storage system is configured to reserve the second storage region, with a capacity that is the reservation capacity transmitted from the management server, and wherein the first storage system is configured to execute a copying of the data corresponding to the virtual logical volume from the first storage region to the second storage region, after the reservation of the second storage region.

11. The data processing system of claim 10, wherein the first storage system is configured to check for an unassigned segment existing in the second storage region, and release the unassigned segment after the data are copied.

12. The data processing system of claim 10, wherein the first storage system is configured to calculate an unassigned capacity of the second storage region, and notify the management server if the reservation capacity transmitted from the management server cannot be secured.

13. The data processing system of claim 10, wherein the first pool is configured in a first storage device of the first storage system, and wherein the second pool is configured in a second storage device of the second storage system.

14. A data management method of a data processing system, the data processing system comprising:
    a first storage system configured with a virtual logical volume that comprises a dynamically expandable volume;
    a second storage system coupled to the first storage system through a data copy network;
    a host computer configured to input data to the virtual logical volume; and
    a management server coupled to the host computer, configured to manage the virtual logical volume,
    wherein the first storage system comprises:
        a first pool configured from a plurality of physical disks and comprising a plurality of segments each with a respective capacity;
    wherein the second storage system comprises:
        a second pool configured from a plurality of physical disks and comprising a plurality of segments each with a respective capacity,
    the method comprising:
        assigning, using the first storage system, one or more of the plurality of segments of a storage region in the first pool as a current capacity to the virtual logical volume, in response to a request from the host computer to input data;
        copying, using the management server, data in an operation comprising:
            (A) confirming a connection status of the host computer and the virtual logical volume upon receiving a request from the host computer for copying data corresponding to the virtual logical volume, from the storage region in the first pool to another storage region in the second pool; and
            (B) transmitting to the first storage system, as a reservation capacity, if the host computer and the virtual logical volume are coupled, a maximum capacity of the data held in the one or more segments of the first storage region in the first pool requested by the host computer to be assigned to the virtual logical volume for the copying, and transmitting to the first storage system, as the reservation capacity, if the host computer and the virtual logical volume are not coupled, the current capacity of the one or more segments of the first storage region which are currently assigned to the virtual logical volume,
        reserving, using the first storage system, the second storage region, with a capacity that is the reservation capacity transmitted from the management server; and
        executing, using the first storage system, a copying of the data corresponding to the virtual logical volume from the first storage region to the second storage region, after the reservation of the second storage region.

15. The data management method of claim 14, further comprising:
    checking, using the first storage system, an unassigned segment existing in the second storage region; and
    releasing the unassigned segment after the data are copied.

16. The data management method of claim 14, further comprising:
    calculating, using the first storage system, an unassigned capacity of the second storage region; and
    notifying the management server that the reservation capacity cannot be secured if the reservation capacity transmitted from the management server cannot be secured.

17. The data management method of claim 14, wherein the first pool is configured in a first storage device of the first storage system, and wherein the second pool is configured in a second storage device of the second storage system.

18. The data management method of claim 14, further comprising:
    migrating to the second storage region the data stored in the first storage region assigned to virtual logical volume; and
    releasing the reservation of unused capacity if the unused capacity exists in the capacity reserved after the data are migrated in said migrating.

19. The data management method of claim 18, wherein in said migrating, the data stored in the first storage region assigned to the virtual logical volume is copied to the second storage region.

20. The data management method of claim 17, wherein in said reserving, the unused capacity of the second storage region is calculated, and capacity in the second storage region is reserved if the capacity transmitted in said transmitting can be secured, and wherein the management server is notified to the effect that capacity cannot be secured if the capacity transmitted in said transmitting cannot be secured.

* * * * *